United States Patent
Nukada et al.

Patent Number: 5,817,739
Date of Patent: Oct. 6, 1998

[54] CHARGE TRANSPORTING POLYMER AND ORGANIC ELECTRONIC DEVICE CONTAINING THE SAME

[75] Inventors: Katsumi Nukada; Masahiro Iwasaki; Akira Imai, all of Minami Ashigara, Japan

[73] Assignee: Fuji Xerox Co., Ltd., Tokyo, Japan

[21] Appl. No.: 732,977

[22] Filed: Oct. 16, 1996

[30] Foreign Application Priority Data

Oct. 18, 1995 [JP] Japan ........................ 7-293761

[51] Int. Cl.$^6$ .......................... C08G 69/08; G03G 5/047
[52] U.S. Cl. .............................. 528/292; 430/59
[58] Field of Search .................... 528/176, 183, 528/191, 202, 203, 290, 292; 525/439; 430/58, 59

[56] References Cited

U.S. PATENT DOCUMENTS

| | | |
|---|---|---|
| 4,801,517 | 1/1989 | Frechet et al. . |
| 4,806,443 | 2/1989 | Yanus et al. . |
| 4,806,444 | 2/1989 | Yanus et al. . |
| 4,937,165 | 6/1990 | Ong et al. . |
| 4,959,288 | 9/1990 | Ong et al. . |
| 4,983,482 | 1/1991 | Ong et al. . |
| 5,011,906 | 4/1991 | Ong et al. ............. 430/59 |
| 5,034,296 | 7/1991 | Ong et al. . |
| 5,604,064 | 2/1997 | Nulcada et al. ............. 430/59 |

FOREIGN PATENT DOCUMENTS

| | | |
|---|---|---|
| B2-59-28903 | 7/1984 | Japan . |
| A-61-20953 | 1/1986 | Japan . |
| A-1-134456 | 5/1989 | Japan . |
| A-1-134457 | 5/1989 | Japan . |
| A-1-134462 | 5/1989 | Japan . |
| A-4-133065 | 5/1992 | Japan . |
| A-4-133066 | 5/1992 | Japan . |
| A-4-189873 | 7/1992 | Japan . |
| A-5-43813 | 2/1993 | Japan . |
| A-5-80550 | 4/1993 | Japan . |
| A-5-98181 | 4/1993 | Japan . |
| A-5-140472 | 6/1993 | Japan . |
| A-5-140473 | 6/1993 | Japan . |
| A-5-263007 | 10/1993 | Japan . |
| A-5-279591 | 10/1993 | Japan . |

OTHER PUBLICATIONS

37th Meeting of Applied Physics Related Assoc, JSAP Catalog No: AP 901110–03, 31p–K–12 (1990).

The 6th Int'l Congress on Advances in Non–Impact Printing Technologies, (1990), D. K. Murti et al., "Charge transport polymers baed on triphenylamine and tetraphenylbenzidine moieties", pp. 306–311.

Jikken Kagaku Koza (4th ed), vol. 28, pp. 1–230.

*Primary Examiner*—John Goodrow
*Attorney, Agent, or Firm*—Oliff & Berridge, PLC

[57] ABSTRACT

A charge transporting polymer represented by formula (I-1) or (I-2) and an electrophotographic photoreceptor containing the same:

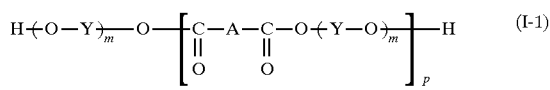

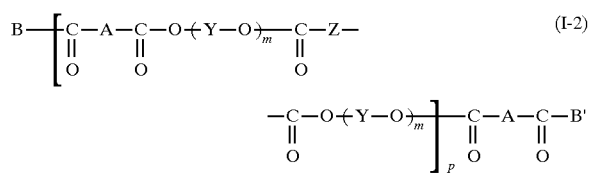

wherein Y and Z each represents a divalent hydrocarbon group;

A represents a group represented by formula:

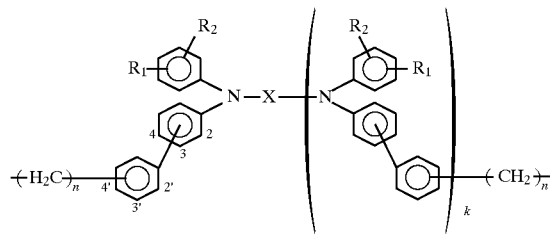

wherein $R_1$ and $R_2$ each represents a hydrogen atom, an alkyl group, an alkoxy group, a substituted amino group or a halogen atom; X represents a substituted or unsubstituted divalent aromatic group; n represents an integer of 1 to 5; and k represents 0 or 1; B and B' each represents —O—(Y—O)$_m$—H or —O—(Y—O)$_m$—CO—Z—CO—OR' (wherein R' represents a hydrogen atom, an alkyl group, a substituted or unsubstituted aryl group or a substituted or unsubstituted aralkyl group; Y and Z are as defined above; and m represents an integer of 1 to 5); m represents an integer of 1 to 5; and p represents an integer of 5 to 5000.

The charge transporting polymer has excellent solubility and film-forming properties and can have its ionizing potential controlled.

11 Claims, 8 Drawing Sheets

CHARGE TRANSPORTING POLYMER AND ORGANIC ELECTRONIC DEVICE CONTAINING THE SAME

FIELD OF THE INVENTION

This invention relates to a novel charge transporting polymer and an organic electronic device containing the same, particularly an electrophotographic photoreceptor.

BACKGROUND OF THE INVENTION

Charge transporting polymers typified by polyvinylcarbazole (PVK) are promising as photoconductive materials for use in electrophotographic photoreceptors or, as reported in the proceedings of the 37th Meeting of Applied Physics Related Association, 31p-K-12 (1990), as organic materials for use in electroluminescent (EL) devices. For these uses, charge transporting polymers are used in the form of a layer to serve as a charge transporting layer.

In addition to the charge transporting polymers, such as PVK, low-molecular disperse systems comprising a low-molecular weight charge transporting compound dispersed in a polymer are also well-known as materials providing a charge transporting layer. Organic EL devices generally have a layer of the low-molecular weight charge transporting material formed by vacuum evaporation. Of these charge transporting materials, the low-molecular disperse systems have been used predominantly especially in electrophotographic photoreceptors for the freedom of choice of material and high functions obtained.

While the recent advanced performance of organic photoreceptors has made them applicable to high-speed copying machines and printers, the-state-of-art organic photoreceptors are not necessarily sufficient in performance when applied to high-speed copying machines or printers. In particular, improvement in durability of organic photoreceptors has been demanded.

One of the factors decisive of the durability of an organic photoreceptors is abrasion resistance of its charge transporting layer. Charge transporting layers of low-molecular disperse system, which are of predominant use, have shown satisfactory electrical characteristics. However, they have low mechanical strength in nature of including low molecular weight charge transporting material and have poor resistance against abrasion. Further, when applied to EL devices, the low-molecular charge transporting material tends to melt due to generated Joule's heat and to crystallize, which cause morphologic changes of the film.

On the other hand, charge transporting polymers have been studied with expectation of eliminating the above-mentioned disadvantages. Examples of charge transporting polymers proposed to date include polycarbonate prepared from a specific dihydroxyarylamine and a bischloroformate, disclosed in U.S. Pat. No. 4,806,443; polycarbonate prepared from a specific dihydroxyarylamine and phosgene, disclosed in U.S. Pat. No. 4,806,444; polycarbonate prepared from a bishydroxyalkylarylamine and a bischloroformate or phosgene, disclosed in U.S. Pat. No. 4,801,517; polycarbonate prepared from a specific dihydroxyarylamine or a bishydroxyalkylarylamine and a bischloroformate or polyester prepared from the former monomer and a bisacyl halide, disclosed in U.S. Pat. Nos. 4,937,165 and 4,959,288; polycarbonate or polyester of an arylamine having a specific fluorene skeleton, disclosed in U.S. Pat. No. 5,034,296; polyurethane, disclosed in U.S. Pat. No. 4,983,482; and polyester comprising a specific bisstyrylbisarylamine as a main chain, disclosed in JP-B-59-28903 (the term "JP-B" as used herein means an "examined published Japanese patent application"). Further, JP-A-61-20953, JP-A-1-134456, JP-A-1-134457, JP-A-1-134462, JP-A-4-133065, and JP-A-4-133066 (the term "JP-A" as used herein means an "unexamined published Japanese patent application) propose polymers having as a pendant group a charge transporting substituent, such as a hydrazone residue or a triarylamine residue, and photoreceptors containing the same.

Charge transporting polymers are required to have various characteristics, such as solubility, mobility, and matching of oxidation potential. In order to meet these requirements, the physical properties of the charge transporting polymers can be controlled by introducing various substituents. Since the ionizing potential of a charge transporting polymer is almost ruled by that of the starting charge transporting monomer, ionizing potential controllability of charge transporting monomers is of importance. Monomers providing the above illustrated triarylamine polymers are divided into (1) dihydroxyarylamines and (2) bishydroxyalkylarylamines. Dihydroxyarylamines are susceptible to oxidation because of their aminophenol structure and are difficult to purify. Those having a p-hydroxy-substituted structure are less stable. However, it is difficult to control the ionizing potential by altering the position of the substituent. Further, the structure having oxygen directly bonded to the aromatic nucleus, the charge distribution is liable to be imbalanced due to the electron attracting property of oxygen, tending to cause reduction in mobility. In the bishydroxyalkylarylamines, on the other hand, the influence of electron attraction of oxygen is eliminated by the methylene group. However, these monomers are difficult to synthesize. That is, a bishydroxyalkylarylamines is synthesized by reacting a diarylamine or a diarylbenzidine and 3-bromoiodobenzene, reacting bromine of the resulting compound with an alkyl lithium, and reacting the resulting compound with ethylene oxide. However since the bromine and iodine of 3-bromoiodobenzene are both reactive, the reaction product tends to be obtained as a mixture, and the reaction yield is so reduced. Further, an alkyl lithium and ethylene oxide are dangerous and toxic and need care in handling.

SUMMARY OF THE INVENTION

An object of the present invention is to provide a novel charge transporting polymer effective in various organic electronic devices, which has high solubility and excellent film-forming properties, which can be synthesized with ease, and whose ionizing potential can be controlled.

Another object of the present invention is to provide an organic electronic device containing the novel charge transporting polymer.

A further object of the invention is to provide an electrophotographic photoreceptor containing the novel charge transporting polymer.

As a result of extensive investigations, the inventors of the present invention have found that a novel charge transporting polymer represented by formula (I-1) or (I-2) shown below exhibits excellent charge transporting properties and mechanical strength and that an electrophotographic photoreceptor containing the same exhibits high durability. The invention has been completed based on this finding.

The present invention provides a charge transporting polymer represented by formula (I-1) or (I-2):

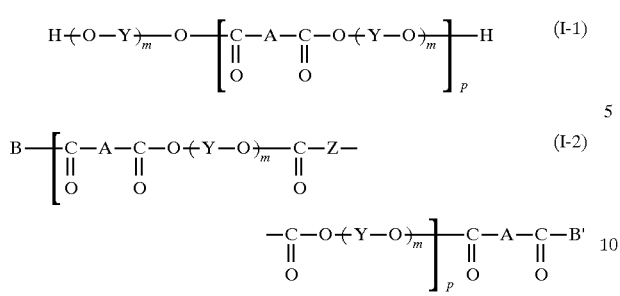

(I-1)

(I-2)

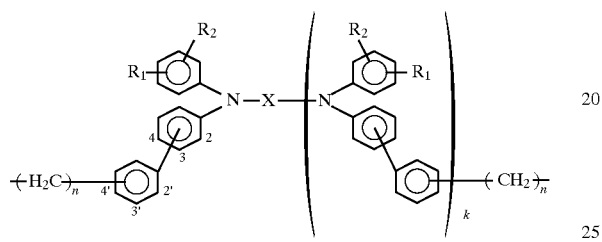

wherein Y represents a divalent hydrocarbon group; Z represents a divalent hydrocarbon group; A represents a group represented by formula:

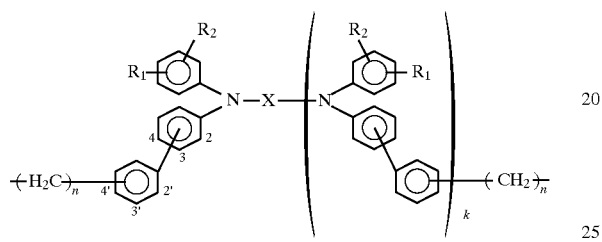

wherein $R_1$ and $R_2$ each independently represents a hydrogen atom, an alkyl group, an alkoxy group, a substituted amino group or a halogen atom; X represents a substituted or unsubstituted divalent aromatic group; n represents an integer of 1 to 5; and k represents 0 or 1, B and B' each represents a group —O—(Y—O)$_m$—H or a group —O—(Y—O)$_m$—CO—Z—CO—OR' (wherein R' represents a hydrogen atom, an alkyl group, a substituted or unsubstituted aryl group or a substituted or unsubstituted aralkyl group; Y represents a divalent hydrocarbon group; Z represents a divalent hydrocarbon group; and m represents an integer of 1 to 5); m represents an integer of 1 to 5; and p represents an integer of 5 to 5000.

The invention also provides an organic electronic device particularly an electrophotographic photoreceptor, which contains the charge transporting polymer represented by formula (I-1) or (I-2).

DETAILED DESCRIPTION OF THE INVENTION

Figure 1:
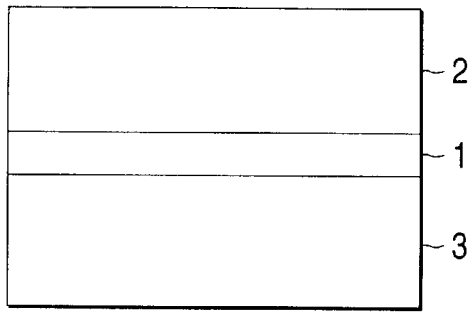
FIGS. 1(a)–(f) shows a schematic cross section each of electrophotographic photoreceptors according to the invention.
Figure 1:
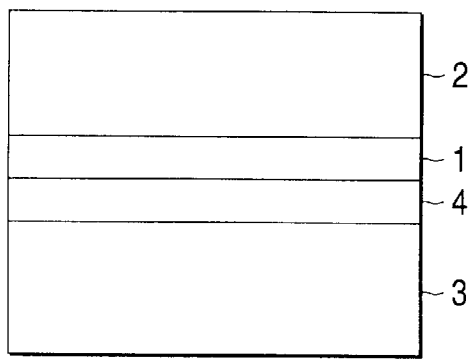
Figure 1:
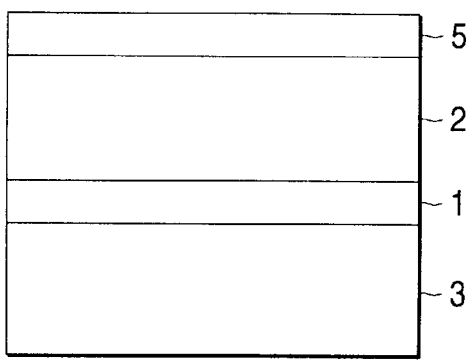
Figure 1:
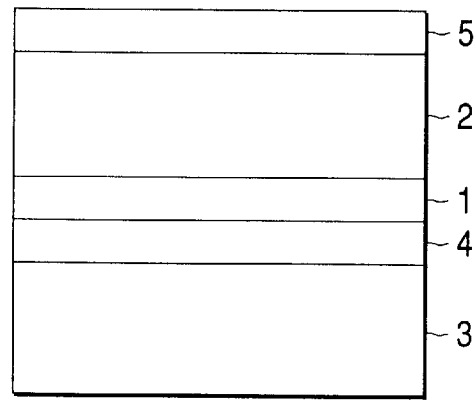
Figure 1:
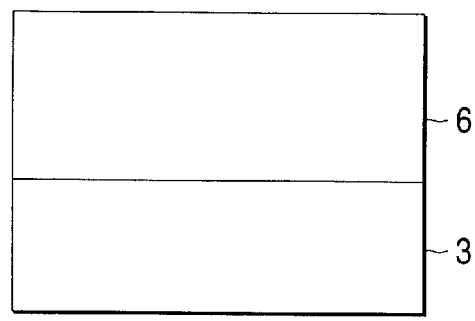
Figure 1:
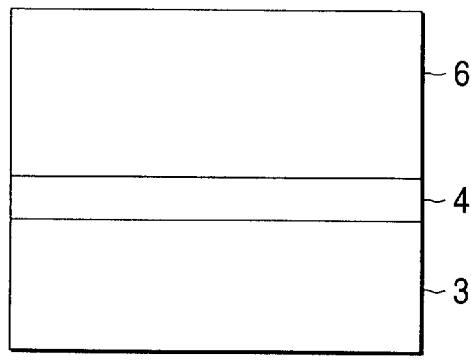

Examples of X, Y, and Z in formulae (I-1) and (I-2) are as follows.

Examples of X are groups (1) to (7) shown below.

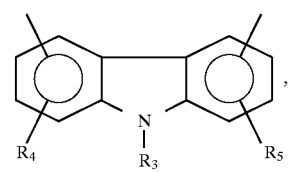

(1)

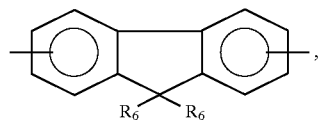

(2)

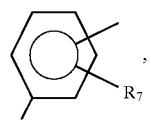

(3)

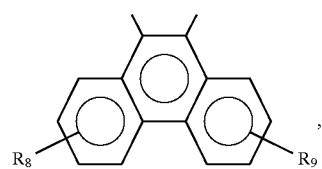

(4)

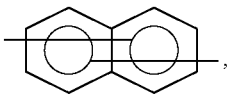

(5)

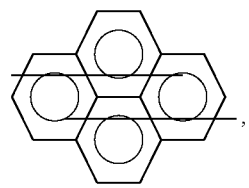

(6)

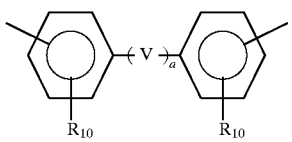

(7)

wherein $R_3$ represents a hydrogen atom, an alkyl group having 1 to 4 carbon atoms, a substituted or unsubstituted phenyl group, or a substituted or unsubstituted aralkyl group; $R_4$, $R_5$, $R_6$, $R_7$, $R_8$, $R_9$, and $R_{10}$ each represents a hydrogen atom, an alkyl group having 1 to 4 carbon atoms, an alkoxy group having 1 to 4 carbon atoms, a substituted or unsubstituted phenyl group, a substituted or unsubstituted aralkyl group or a halogen atom; a represents 0 or 1; and V represents a group selected from groups (8) to (17):

 (8)

 (9)

—O—, (10)

—S—, (11)

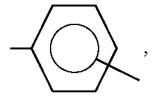 (12)

 (13)

-continued

—C(CF₃)₂—, (14)
—Si(CH₃)₂—, (15)
—CH=CH—, (16)

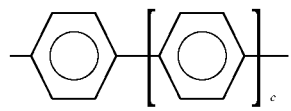 (17)

wherein b represents an integer of 1 to 10; and c represents an integer of 1 to 3.

Examples of Y and Z include the following groups (18) to (24):

$-\!\!-(CH_2)_d\!\!-\!\!-$, (18)

$-\!\!-(CH_2CH_2O)_e\!\!-\!\!-(CH_2CH_2)\!\!-\!\!-$, (19)

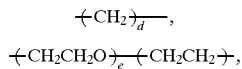 (20)

 (21)

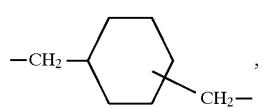 (22)

 (23)

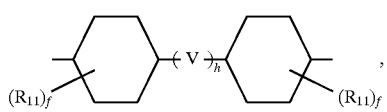

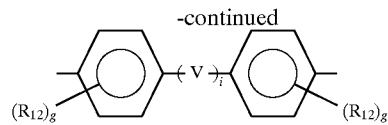 (24)

wherein $R_{11}$ and $R_{12}$ each represents a hydrogen atom, an alkyl group having 1 to 4 carbon atoms, an alkoxy group having 1 to 4 carbon atoms, a substituted or unsubstituted phenyl group, a substituted or unsubstituted aralkyl group or a halogen atom; d and e each represents an integer of 1 to 10; f and g each represents 0, 1 or 2; h and i each represents 0 or 1; and V is as defined above.

The charge transporting polymers of the invention have a degree of polymerization, as represented by symbol "p", of 5 to 5,000, preferably 10 to 1,000. They preferably have a weight average molecular weight Mw of 10,000 to 300,000.

Specific but non-limiting examples of the charge transporting polymers according to the invention are shown in Tables 1 through 8 below. Of the polymers shown those in which X is a biphenyl structure (A) or (B) shown below are particularly preferred for their high mobility as reported in The 6th International Congress on Advances in Non-impact Printing Technologies, 306 (1990).

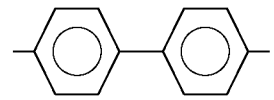 (A)

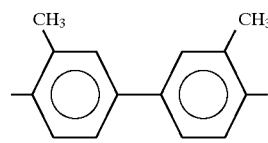 (B)

TABLE 1

| Compound | X | Y | Z | $R_1$ | $R_2$ | Bonding site | k | m | n | p |
|---|---|---|---|---|---|---|---|---|---|---|
| 1 | biphenyl | —CH₂CH₂— | — | H | H | 4.4' | 0 | 1 | 1 | 195 |
| 2 | biphenyl | —CH₂CH₂— | — | H | H | 4.4' | 0 | 1 | 2 | 205 |
| 3 | biphenyl | —CH₂CH₂— | — | 3-CH₃ | 4-CH₃ | 4.4' | 0 | 1 | 1 | 210 |
| 4 | biphenyl | —CH₂CH₂— | — | H | H | 4.4' | 1 | 1 | 1 | 140 |
| 5 | biphenyl | —CH₂CH₂— | — | H | H | 4.4' | 1 | 1 | 2 | 155 |
| 6 | biphenyl | —CH₂CH₂— | — | H | 4-C₆H₅ | 4.4' | 1 | 1 | 2 | 150 |
| 7 | biphenyl | —CH₂CH₂— | — | 3-CH₃ | 4-CH₃ | 4.4' | 1 | 1 | 1 | 160 |
| 8 | biphenyl | —CH₂CH₂— | — | H | 4-CH₃ | 4.4' | 1 | 1 | 2 | 155 |
| 9 | biphenyl | —CH₂CH₂— | — | 3-CH₃ | 4-CH₃ | 4.4' | 1 | 1 | 2 | 170 |

TABLE 1-continued

| Compound | X | Y | Z | R₁ | R₂ | Bonding site | k | m | n | p |
|---|---|---|---|---|---|---|---|---|---|---|
| 10 | biphenyl | —CH₂CH₂— | phenyl | H | H | 4.4' | 1 | 1 | 2 | 25 |
| 11 | biphenyl | —CH₂CH₂— | phenyl | H | H | 4.4' | 1 | 1 | 2 | 30 |
| 12 | biphenyl | —CH₂CH₂— | phenyl | H | H | 4.4' | 1 | 1 | 4 | 25 |
| 13 | biphenyl | —CH₂CH₂— | methylphenyl | H | H | 4.4' | 1 | 1 | 2 | 20 |
| 14 | biphenyl | —CH₂CH₂— | biphenyl | H | H | 4.4' | 1 | 1 | 2 | 20 |

TABLE 2

| Compound | X | Y | Z | R₁ | R₂ | Bonding site | k | m | n | p |
|---|---|---|---|---|---|---|---|---|---|---|
| 15 | biphenyl | —CH₂CH₂— | trimethylphenyl | H | H | 4.4' | 1 | 1 | 2 | 15 |
| 16 | biphenyl | —(CH₂)₄— | —(CH₂)₄— | 4-CH₃ | H | 4.4' | 1 | 1 | 2 | 30 |
| 17 | biphenyl | cyclohexyl | — | H | H | 4.4' | 1 | 2 | 1 | 165 |
| 18 | biphenyl | cyclohexyl | phenyl | H | H | 4.4' | 1 | 2 | 1 | 35 |
| 19 | biphenyl | cyclohexyl | biphenyl | H | H | 4.4' | 1 | 2 | 1 | 30 |
| 20 | biphenyl | cyclohexyl | —(CH₂)₄— | H | H | 4.4' | 1 | 2 | 1 | 35 |
| 21 | biphenyl | cyclohexyl-bis(CH₂) | — | H | H | 4.4' | 1 | 2 | 1 | 150 |
| 22 | dimethyl-biphenyl | —CH₂CH₂— | — | H | H | 4.4' | 1 | 2 | 1 | 200 |
| 23 | dimethyl-biphenyl | —CH₂CH₂— | phenyl | H | H | 4.4' | 1 | 2 | 1 | 25 |
| 24 | dimethyl-biphenyl | cyclohexyl | — | H | H | 4.4' | 1 | 2 | 1 | 190 |

TABLE 3
| Compound | X | Y | Z | R₁ | R₂ | Bonding site | k | m | n | p |
|---|---|---|---|---|---|---|---|---|---|---|
| 25 | 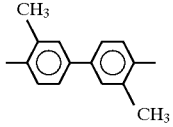 |  | — | H | H | 4.4' | 1 | 2 | 1 | 175 |
| 26 | 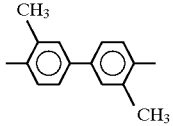 | 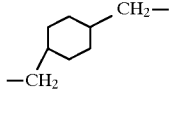 | 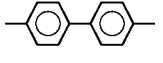 | H | H | 4.4' | 1 | 2 | 1 | 30 |
| 27 | 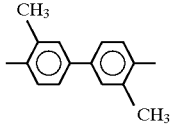 | —CH₂CH₂— | — | 2-CH₃ | H | 4.4' | 1 | 2 | 1 | 160 |
| 28 | 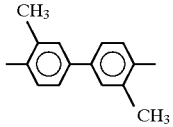 | —CH₂CH₂— |  | 3-CH₃ | H | 4.4' | 1 | 2 | 1 | 25 |
| 29 | 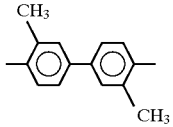 |  | — | 4-CH₃ | H | 4.4' | 1 | 2 | 1 | 185 |
| 30 | 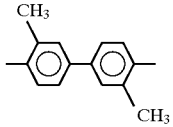 |  | — | 3-CH₃ | 4-CH₃ | 4.4' | 1 | 2 | 1 | 160 |
| 31 | 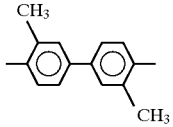 | 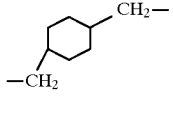 | 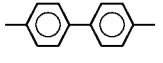 | 3-CH₃ | 5-CH₃ | 4.4' | 1 | 2 | 1 | 30 |
TABLE 4
| Compound | X | Y | Z | R₁ | R₂ | Bonding site | k | m | n | p |
|---|---|---|---|---|---|---|---|---|---|---|
| 32 | 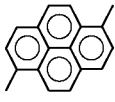 | —CH₂CH₂— | — | H | H | 4.4' | 1 | 1 | 2 | 170 |
| 33 | 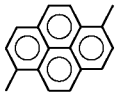 | —CH₂CH₂— |  | H | H | 4.4' | 1 | 1 | 2 | 40 |
| 34 |  |  | — | H | H | 4.4' | 1 | 1 | 2 | 155 |
| 35 |  |  | — | H | H | 4.4' | 1 | 1 | 2 | 150 |

TABLE 4-continued

| Compound | X | Y | Z | R₁ | R₂ | Bonding site | k | m | n | p |
|---|---|---|---|---|---|---|---|---|---|---|
| 36 | (pyrene) | -CH₂-(cyclohexyl)-CH₂- | (biphenyl) | H | H | 4,4' | 1 | 1 | 2 | 30 |
| 37 | (pyrene) | -CH₂CH₂- | — | 2-CH₃ | H | 4,4' | 1 | 1 | 2 | 170 |
| 38 | (pyrene) | -CH₂CH₂- | (phenyl) | 3-CH₃ | H | 4,4' | 1 | 1 | 2 | 35 |

TABLE 5

| Compound | X | Y | Z | R₁ | R₂ | Bonding site | k | m | n | p |
|---|---|---|---|---|---|---|---|---|---|---|
| 39 | (pyrene) | (cyclohexyl) | — | 4-CH₃ | H | 4,4' | 1 | 1 | 2 | 160 |
| 40 | (pyrene) | (cyclohexyl) | — | 3-CH₃ | 4-CH₃ | 4,4' | 1 | 1 | 2 | 150 |
| 41 | (pyrene) | -CH₂-(cyclohexyl)-CH₂- | (biphenyl) | 3-CH₃ | 5-CH₃ | 4,4' | 1 | 1 | 2 | 25 |
| 42 | CH₃O-(biphenyl)-OCH₃ | -CH₂CH₂- | — | H | H | 4,4' | 1 | 1 | 2 | 190 |
| 43 | CH₃O-(biphenyl)-OCH₃ | -CH₂CH₂- | (phenyl) | H | H | 4,4' | 1 | 1 | 2 | 30 |
| 44 | CH₃O-(biphenyl)-OCH₃ | (cyclohexyl) | — | H | H | 4,4' | 1 | 1 | 2 | 170 |

TABLE 6

| Compound | X | Y | Z | R₁ | R₂ | Bonding site | k | m | n | p |
|---|---|---|---|---|---|---|---|---|---|---|
| 45 | CH₃O-(biphenyl)-OCH₃ | (cyclohexyl) | — | H | H | 4,4' | 1 | 1 | 2 | 160 |

TABLE 6-continued

| Compound | X | Y | Z | R₁ | R₂ | Bonding site | k | m | n | p |
|---|---|---|---|---|---|---|---|---|---|---|
| 46 | CH₃O-biphenyl-OCH₃ | cyclohexane-1,4-diyl-bis(CH₂) | biphenyl | H | 4-CH₃ | 4,4' | 1 | 1 | 2 | 25 |
| 47 | 2,7-dimethyl-9,9-dimethylfluorene | —CH₂CH₂— | — | H | H | 4,4' | 1 | 1 | 2 | 185 |
| 48 | 2,7-dimethyl-9,9-dimethylfluorene | —CH₂CH₂— | phenyl | H | H | 4,4' | 1 | 1 | 2 | 35 |
| 49 | 2,7-dimethyl-9,9-dimethylfluorene | cyclohexane-1,4-diyl | — | H | H | 4,4' | 1 | 1 | 2 | 170 |
| 50 | 2,7-dimethyl-9,9-dimethylfluorene | cyclohexane-1,1-diyl | — | H | H | 4,4' | 1 | 1 | 2 | 160 |

TABLE 7

| Compound | X | Y | Z | R₁ | R₂ | Bonding site | k | m | n | p |
|---|---|---|---|---|---|---|---|---|---|---|
| 51 | 2,7-dimethyl-9,9-dimethylfluorene | cyclohexane-1,4-diyl-bis(CH₂) | biphenyl | H | H | 4,4' | 1 | 1 | 2 | 25 |
| 52 | 2,7-dimethyl-9,9-dimethylfluorene | —CH₂CH₂— | — | 2-CH₃ | H | 4,4' | 1 | 1 | 2 | 190 |
| 53 | 2,7-dimethyl-9,9-dimethylfluorene | —CH₂CH₂— | phenyl | 3-CH₃ | H | 4,4' | 1 | 1 | 2 | 30 |
| 54 | 2,7-dimethyl-9,9-dimethylfluorene | cyclohexane-1,4-diyl | — | 4-CH₃ | H | 4,4' | 1 | 1 | 2 | 180 |
| 55 | 2,7-dimethyl-9,9-dimethylfluorene | cyclohexane-1,1-diyl | — | 3-CH₃ | 4-CH₃ | 4,4' | 1 | 1 | 2 | 160 |
| 56 | 2,7-dimethyl-9,9-dimethylfluorene | cyclohexane-1,4-diyl-bis(CH₂) | biphenyl | 3-CH₃ | 5-CH₃ | 4,4' | 1 | 1 | 2 | 25 |

TABLE 8

| Compound | X | Y | Z | R₁ | R₂ | Bonding site | k | m | n | p |
|---|---|---|---|---|---|---|---|---|---|---|
| 57 | 2,7-dimethyl-9,9-dimethylfluorene | 2,2-bis(phenyl)propane | — | 3-CH₃ | 5-CH₃ | 4,4' | 1 | 1 | 2 | 130 |

TABLE 8-continued

| Compound | X | Y | Z | R₁ | R₂ | Bonding site | k | m | n | p |
|---|---|---|---|---|---|---|---|---|---|---|
| 58 | (dimethylfluorene with CH₃ substituents) | (bisphenyl with C(CH₃)₂ linker) | (bisphenyl with C(CH₃)₂ linker) | 3-CH₃ | 5-CH₃ | 4,4' | 1 | 1 | 2 | 25 |

Monomers providing the charge transporting polymers of the invention can easily be synthesized by reacting an arylamine or a diarylbenzidine, etc. with a halogenated carboalkoxyalkylbenzene.

Synthesis of a charge transporting material having an alkylenecarboxylic acid ester group is described in JP-A-5-80550, comprising introduction of a chloromethyl group, preparation of a Grignard reagent with magnesium, conversion with carbon dioxide to a carboxylic acid, followed by esterification. However, it is not allowed to introduce a chloromethyl group from the initial stage of the starting material because of the high reactivity of the chloromethyl group. Therefore, formation of a triarylamine skeleton, a tetraarylamine skeleton, etc. should precede formation of a chloromethyl group by chlorination of the methyl group that has been introduced in the initial stage of the preparation of the starting compound. Alternatively, an unsubstituted starting compound is used to form a tetraarylbenzidine skeleton, a functional group (e.g., formyl group) is introduced thereto by substitution reaction of the aromatic ring, the functional group is reduced to give an alcohol, which is then reacted with a halogenating reagent (e.g., thionyl chloride) to form a chloromethyl group, or the starting compound is directly chloromethylated by using p-formaldehyde and hydrochloric acid, etc. However, because a charge transporting material having such a skeleton as tetraarylbenzidne has very high reactivity, chlorination of the previously introduced methyl group tends to be accompanied by a substitution reaction of halogen on the aromatic ring, and it is practically impossible to selectively chlorinating only the methyl group. Where an unsubstituted starting compound is used, and a functional group (e.g., formyl group) introduced is led to a chloromethyl group, or the unsubstituted starting compound is directly chloromethylated the position to which a chloromethyl group can be introduced is limited to the p-position with respect to the nitrogen atom. It naturally follows that the position of the alkylenecarboxylic acid ester group is limited to the p-position of the nitrogen atom. On the other hand, the process comprising reacting an arylamine or a diarylbenzidine, etc., with a halogenated carboalkoxyalkylbenzene is advantageous in that the position of the substituent can be altered to control the ionizing potential of the charge transporting monomer, thereby making it possible to control the ionizing potential of the charge transporting polymer.

The charge transporting monomer which can be used in the present invention may have various substituents at an arbitrary position thereof. Also, they are chemically stable and therefore easy to handle. The aforesaid problems have thus been solved.

The charge transporting polymer of the invention can be used in combination with any known charge generating material, such as bisazo pigments, phthalocyanine pigments, squarylium pigments, perylene pigments, and dibromoanthanthrone pigments. In particular, the charge transporting polymers of the invention provide excellent electrophotographic photoreceptors having high sensitivity and stability to repeated use when combined with the metallized phthalocyanine pigments previously proposed by the inventors of the present invention, for example, halogenogallium phthalocyanine crystals (JP-A-5-98181), halogenotin phthalocyanine crystals (JP-A-5-140472 and JP-A-5-140473), hydroxygallium phthalocyanine crystals (JP-A-5-263007 and JP-A-5-279591), and titanyl phthalocyanine hydrate crystals (JP-A-4-189873 and JP-A-5-43813). The charge transporting polymers of the invention are also applicable to organic EL devices.

The charge transporting polymer of the invention can be synthesized by polymerizing a charge transporting monomer represented by formula (II) shown below in a known manner, for example, as described in *Jikken Kagaku Koza* (4th ed.), Vol. 28.

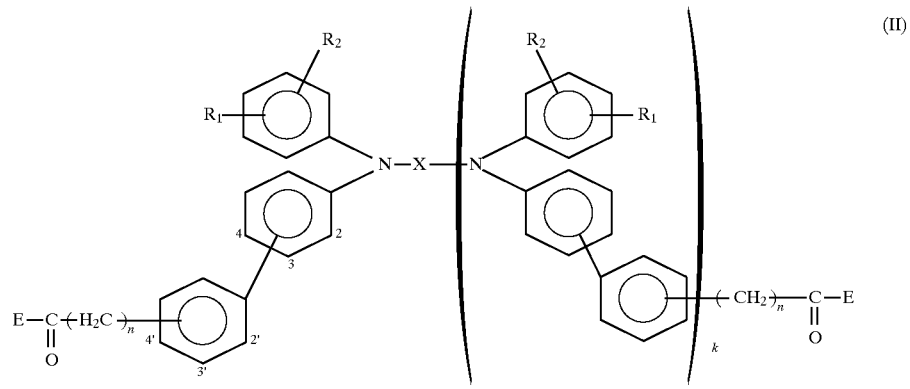

(II)

wherein $R_1$ and $R_2$ each independently represents a hydrogen atom, an alkyl group, an alkoxy group, a substituted amino group, a halogen atom or a substituted or unsubstituted aryl group; X represents a substituted or unsubstituted divalent aromatic group; n represents an integer of 1 to 5; k represents 0 or 1; E represents a hydroxyl group, a halogen atom or —O—$R_{13}$ (wherein $R_{13}$ represents an alkyl group, a substituted or unsubstituted aryl group or an aralkyl group).

More specifically, the charge transporting polymer of formula (I-1) is synthesized as follows.

The monomer of formula (II) wherein E is a hydroxyl group is polymerized together with an approximately equivalent amount of a dihydric alcohol represented by formula: HO—(Y—O)$_m$—H in the presence of an acid catalyst used for general esterification, such as sulfuric acid, toluenesulfonic acid or trifluoroacetic acid. The acid catalyst is used in an amount of 1/10000 to 1/10 part by weight, preferably 1/1000 to 1/50 part by weight, per part by weight of the charge transporting monomer. A solvent capable of forming an azeotropic mixture with water, such as toluene, chlorobenzene or 1-chloronaphthalene, is preferably used to remove the water produced in the polymerization. The solvent is used in an amount of 1 to 100 parts, preferably 2 to 50 parts, by weight per part by weight of the charge transporting monomer. The reaction temperature, while arbitrarily decided, is preferably the boiling point of the solvent so as to remove the water produced in the polymerization.

After completion of the reaction, where no solvent has been used, the reaction mixture is dissolved in a solvent capable of dissolving the reaction product, and the solution is added dropwise to a poor solvent for the polymer produced, such as alcohols (e.g., methanol or ethanol) and acetone. Where the reaction has been conducted in a solvent, the reaction mixture is added to a poor solvent as such. The charge transporting polymer thus precipitated is separated, thoroughly washed with water or an organic solvent, and dried. If desired, the product may further be purified by repeating dissolving in an appropriate organic solvent and re-precipitating in a poor solvent. The re-precipitation of the polymer is preferably carried out while efficiently stirring by means of a mechanical stirrer, etc. The solvent for dissolving the charge transporting polymer is used in an amount of 1 to 100 parts, preferably 2 to 50 parts, by weight per part by weight of the charge transporting polymer. The poor solvent is used in an amount of 1 to 1000 parts, preferably 10 to 500 parts, by weight per part by weight of the charge transporting polymer.

The monomer of formula (II) wherein E is a halogen atom is polymerized together with an approximately equivalent amount of a dihydric alcohol represented by formula: HO—(Y—O)$_m$—H in the presence of an organic basic catalyst, such as pyridine or triethylamine. The organic basic catalyst is used in an amount of 1 to 10 equivalents, preferably 2 to 5 equivalents, per equivalent of the charge transporting monomer. An effective solvent can be methylene chloride, tetrahydrofuran (THF), toluene, chlorobenzene or 1-chloronaphthalene. The solvent is used in an amount of 1 to 100 parts; preferably 2 to 50 parts, by weight per part by weight of the charge transporting monomer. The reaction temperature is selected arbitrarily. After the polymerization, the reaction mixture is purified by re-precipitation as described above.

When the monomer is combined with a highly acidic dihydric alcohol, such as bisphenol, the polymerization can also be performed by interfacial polymerization, in which such a dihydric alcohol is added to water, an equivalent amount of a base is dissolved therein, and a solution of an equivalent amount, to the dihydric alcohol, of the charge transporting monomer is added to the alcohol solution while vigorously stirring. Water is used in an amount of 1 to 1000 parts, preferably 2 to 500 parts, by weight per part by weight of the dihydric alcohol. Effective solvents for dissolving the charge transporting monomer include methylene chloride, dichloroethane, trichloroethane, toluene, chlorobenzene, and 1-chloronaphthalene. The reaction temperature is selected arbitrarily. Use of a phase transfer catalyst, such as an ammonium salt or a sulfonium salt, is effective for reaction acceleration. The phase transfer catalyst is used in an amount of 0.1 to 10 parts, preferably 0.2 to 5 parts, per part by weight of the charge transporting monomer.

Where the charge transporting monomer of formula (II) wherein E is —O—$R_{13}$ is used, the charge transporting polymer is synthesized by ester exchange by heating the monomer with an excess of a dihydric alcohol represented by formula: HO—(Y—O)$_m$—H in the presence of a catalyst, such as an inorganic acid (e.g., sulfuric acid or phosphoric acid), a titanium alkoxide, an acetate or a carbonate of calcium or cobalt, or an oxide of zinc or lead. The dihydric alcohol is used in an amount of 2 to 100 equivalents, preferably 3 to 50 equivalents, per equivalent of the charge transporting monomer. The catalyst is used in an amount of 1/10000 to 1 part, preferably 1/1000 to ½ part, per part by weight of the charge transporting monomer. The reaction is carried out at 200° to 300° C. After ester exchange of —O—$R_{13}$ for —O—(Y—O)$_m$—H, the reaction is preferably conducted under reduced pressure in order to accelerate the polymerization-by release of HO—(Y—O)$_m$—H. It is possible to perform the reaction under atmospheric pressure while azeotropically releasing HO—(Y—O)$_m$—H by using a high-boiling solvent capable of forming an azeotropic mixture with HO—(Y—O)$_m$—H, such as 1-chloronaphthalene.

The charge transporting polymer of formula (I-2) is synthesized as follows.

In each of the above-described reaction modes, the dihydric alcohol is added in excess, and the resulting compound represented by formula (III) shown below is reacted as a charge transporting monomer with a dicarboxylic acid or a dicarboxylic acid halide, etc. in the same manner as described above, to obtain the charge transporting polymer. The degree of polymerization (p) of the charge transporting polymer ranges from 5 to 5000, preferably from 10 to 3000, still preferably from 15 to 1000. If it is too low, the polymer has poor film-forming properties, failing to provide a strong film. If it is too high, the polymer has low solubility in solvents and thereby poor processability.

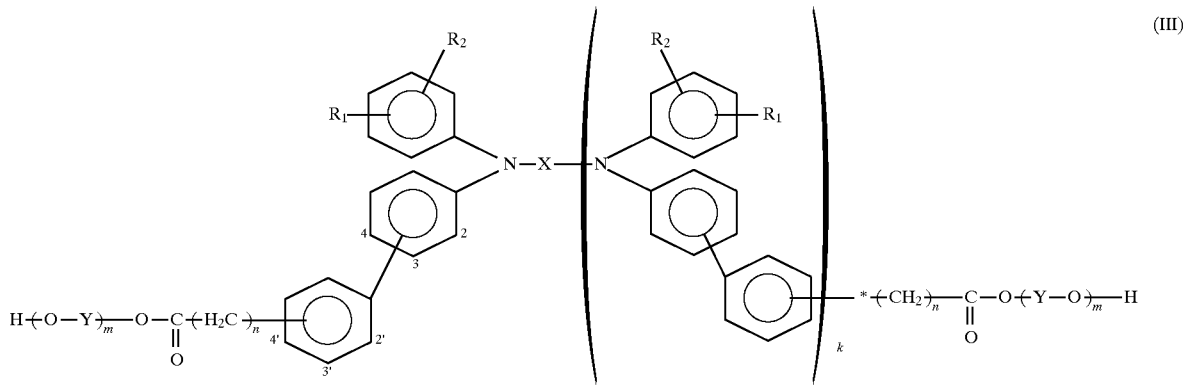

wherein $R_1$ and $R_2$ each independently represents a hydrogen atom, an alkyl group, an alkoxy group, a substituted amino group, a halogen atom or a substituted or unsubstituted aryl group; X represents a substituted or unsubstituted divalent aromatic group; Y represents a divalent hydrocarbon group; n and m each represents an integer of 1 to 5; and k represents 0 or 1.

The novel charge transporting polymer according to the present invention is useful in organic electronic devices.

In the organic electronic devices of the invention, the charge transporting polymer may be used in combination with compatible insulating polymers. The charge transporting polymer of the invention is applicable to electrophotographic photoreceptors, organic EL elements and the like.

More specifically, the organic electronic device can have a structure comprising a substrate having provided thereon a layer containing the charge transporting polymer of the invention. Such an organic electronic device typically includes electrophotographic photoreceptors having a photosensitive layer, especially those containing the charge transporting polymer of formula (I-1) or (I-2) in the surface layer thereof. Preferred electrophotographic photoreceptors can be those containing the charge transporting polymer of formula (I-1) or (I-2) as a charge transporting material and phthalocyanine crystals as a charge generating material in the photosensitive layer thereof. These photoreceptors are particularly excellent in sensitivity and stability against repeated use.

The phthalocyanine crystals which can be used in combination with the charge transporting polymer in the electrophotographic photoreceptors include halogenogallium phthalocyanine crystals (JP-A-5-98181), halogenotin phthalocyanine crystals (JP-A-5-140472 and JP-A-5-140473), hydroxygallium phthalocyanine crystals (JP-A-5-263007 and JP-A-5-279591), and titanyl phthalocyanine hydrate crystals (JP-A-4-189873 and JP-A-5-43813).

Chlorogallium phthalocyanine crystals which can be used in the present invention can be prepared by the process disclosed in JP-A-5-98181, in which chlorogallium phthalocyanine crystals synthesized by a known process are dry ground mechanically in a automatic mortar, a planetary mill, a vibration mill, a CF mill, a roller mill, a sand mill, a kneader, etc., if desired followed by wet grinding using a solvent in a ball mill, a mortar, a sand mill, a kneader, etc. The solvent to be used in the wet grinding include aromatic hydrocarbons (e.g., toluene and chlorobenzene), amides (e.g., dimethylformamide and N-methylpyrrolidone), aliphatic alcohols (e.g., methanol, ethanol, and butanol), aliphatic polyhydric alcohols (e.g., ethylene glycol, glycerin, and polyethylene glycol), aromatic alcohols (e.g., benzyl alcohol and phenethyl alcohol), esters (e.g., acetic esters, e.g., butyl acetate), ketones (e.g., acetone and methyl ethyl ketone), dimethyl sulfoxide, ethers (e.g., diethyl ether and tetrahydrofuran), mixtures of two or more of these organic solvents, and mixtures of these organic solvents and water. These solvents are used in an amount of 1 to 200 parts, preferably 10 to 100 parts, by weight per part by weight of chlorogallium phthalocyanine. The solvent treatment is carried out at a temperature of 0° C. to the boiling point of the solvent, preferably 10° to 60° C. A grinding aid, such as sodium chloride or sodium sulfate, may be used in an amount 0.5 to 20 times, preferably 1 to 10 times, the weight of the pigment.

Dichlorotin phthalocyanine crystals which can be used in the present invention can be prepared by the process disclosed in JP-A-5-140472 and JP-A-5-140473, in which dichlorotin phthalocyanine crystals prepared by a known process are ground and treated with a solvent in the same manner as for the above-mentioned chlorogallium phthalocyanine.

Hydroxygallium phthalocyanine crystals for use in the present invention can be prepared by the process disclosed in JP-A-5-263007 and JP-A-5-279591, in which chlorogallium phthalocyanine crystals prepared by a known process are hydrolyzed in an aqueous acid or alkali solution or subjected to acid pasting to synthesize hydroxygallium phthalocyanine crystals which are then subjected to (i) direct solvent treatment or (ii) wet grinding together with a solvent in a ball mill, a mortar, a sand mill, a kneader, etc., or (iii) dry grinding with no solvent, followed by solvent treatment. The solvent to be used in the solvent treatment or wet grinding includes aromatic hydrocarbons (e.g., toluene and chlorobenzene), amides (e.g., dimethylformamide and N-methylpyrrolidone), aliphatic alcohols (e.g., methanol, ethanol, and butanol), aliphatic polyhydric alcohols (e.g., ethylene glycol, glycerin, and polyethylene glycol), aromatic alcohols (e.g., benzyl alcohol and phenethyl alcohol), esters (e.g., acetic esters, e.g., butyl acetate), ketones (e.g., acetone and methyl ethyl ketone), dimethyl sulfoxide, ethers (e.g., diethyl ether and tetrahydrofuran), mixtures of two or more of these organic solvents, and mixtures of these organic solvents and water. These solvents are used in an amount of 1 to 200 parts, preferably 10 to 100 parts, by weight per part by weight of hydroxygallium phthalocyanine crystals. The treatment is carried out at a temperature of 0° C. to 150° C., preferably from room temperature to 100° C. A grinding aid, such as sodium chloride or sodium sulfate, may be used in an amount 0.5 to 20 times, preferably 1 to 10 times, the weight of the pigment.

Titanyl phthalocyanine crystals for use in the present invention are prepared by the process disclosed in JP-A-4-189873 and JP-A-5-43813, in which titanyl phthalocyanine crystals prepared by a known process are subjected to acid pasting, or salt milling with an inorganic salt by means of a ball mill, a mortar, a sand mill, a kneader, etc., to obtain titanyl phthalocyanine crystals showing a peak at 27.2° C. in X-ray diffractometry and having relatively low crystalline properties, which are then subjected to solvent treatment or wet grinding together with a solvent in a ball mill, a mortar, a sand mill, a kneader, etc. The acid pasting is preferably carried out using sulfuric acid in a concentration of 70 to 100%, preferably 95 to 100%, at a dissolving temperature of −20° to 100° C., preferably 0° to 60° C. Concentrated sulfuric acid is usually used in an amount 1 to 100 times, preferably 3 to 50 times, the weight of the titanyl phthalocyanine crystals. The solvent to be used for precipitation can be water or a mixture of water and an organic solvent at an arbitrary mixing ratio. Mixed solvents of water and an alcohol, e.g., methanol or ethanol, or mixed solvents of water and an aromatic solvent, e.g., benzene or toluene, are particularly preferred. The precipitating temperature is not particularly limited, but it is preferable to cool the system with ice, etc. to prevent heat generation. The ratio of titanyl phthalocyanine crystals to inorganic salt for salt milling ranges from 1/0.1 to 1/20, preferably from 1/0.5 to 1/5, by weight. The solvent which can be used in the subsequent solvent treatment or wet grinding includes aromatic hydrocarbons (e.g., toluene and chlorobenzene), aliphatic alcohols (e.g., methanol, ethanol, and butanol), halogenated hydrocarbons (e.g., dichloromethane, chloroform, and trichloroethane), mixtures of two or more of these organic solvents, and mixtures of these organic solvents and water. These solvents are used in an amount 1 to 100 times, preferably 5 to 50 times, the weight of titanyl phthalocyanine crystals. The treatment is carried out at a temperature of from room temperature to 100° C., preferably from 50° to 100° C. A grinding aid may be used in the wet grinding in an amount 0.5 to 20 times preferably 1 to 10 times, the weight of the pigment.

These phthalocyanine crystals are preferably incorporated as a charge generating material into a charge generating layer constituting a photosensitive layer of an electrophotographic photoreceptor.

FIGS. 1-(a) through 1-(f) is each a schematic cross section of an electrophotographic photoreceptor according to the present invention. The photographic photoreceptor shown in FIG. 1-(a) comprises conductive substrate 3 having thereon charge generating layer 1 and charge transporting layer 2 in this order. The photoreceptor may further have undercoat layer 4 on conductive substrate 3 as in FIG. 1-(b) or protective layer 5 on the surface thereof as in FIG. 1-(c), or both undercoat layer 4 and protective layer 5 as in FIG. 1-(d). The photoreceptors shown in FIGS. 1-(e) and (f) have a single layer structure as a photosensitive layer. The one shown in FIG. 1-(f) has undercoat layer 4. The novel charge transporting polymer of the invention can be applied to any of the layer structures of FIGS. 1-(a) to (f).

The conductive substrate for use in the invention includes metals, such as aluminum, nickel, chromium, and stainless steel; plastic films having laminated thereon a thin film of aluminum, titanium nickel, chromium, stainless steel, gold, vanadium, tin oxide, indium oxide, indium-tin oxide (ITO), etc.; and paper or plastic films coated or impregnated with a conductivity imparting agent. While not limiting the conductive substrate is generally used in the form of a drum, a sheet, a plate, and the like. If desired, the conductive substrate may be subjected to various surface treatments, such as oxidation, chemical treatment, coloration, and surface graining for irregular reflection, as far as the image quality is not impaired.

An undercoat layer may be provided between a conductive substrate and a charge generating layer. An undercoat layer not only blocks injection of unnecessary charges from the conductive substrate into the photosensitive layer at the time of charging but also serves as an adhesive layer for assuring adhesion between the photosensitive layer and the conductive substrate. In some cases, an undercoat layer is also effective to prevent light reflection on a conductive substrate.

Binder resins for use in the undercoat layer are conventional and include polyethylene resins, polypropylene resins, acrylic resins, methacrylic resins, polyamide resins, vinyl chloride resins, vinyl acetate resins, phenolic resins, polycarbonate resins, polyurethane resins, polyimide resins, vinylidene chloride resins, polyvinyl acetal resins, vinyl chloride-vinyl acetate copolymers, polyvinyl alcohol, water-soluble polyester resins, nitrocellulose, casein, gelatin, polyglutamic acid, starch, starch acetate, aminostarch, polyacrylic acid, polyacrylamide, zirconium chelate compounds, titanyl chelate compounds, titanium alkoxides, organotitanium compounds, and silane coupling agents.

The undercoat layer usually has a thickness of from 0.01 to 10 μm, and preferably from 0.05 to 2 μm. The undercoat layer can be formed by usual coating techniques, such as blade coating, wire bar coating, spray coating, dip coating, bead coating, air knife coating, and curtain coating.

In the charge transporting layer, the charge transporting polymer of the invention can be used either alone or in combination with known binder resins or other known charge transporting materials of hydrazone type, triarylamine type, and stilbene type. Illustrative examples of suitable binder resins include polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazole, and polysilane. Of these binder resins, polycarbonate resins represented by formulae (IV) to (IX) shown below or copolycarbonate resins thereof are particularly compatible with the charge transporting polymers of the invention to provide a uniform film exhibiting satisfactory characteristics. The polycarbonate resins can have a viscosity-average molecular weight of 10,000 to 100,000, preferably 10,000 to 50,000.

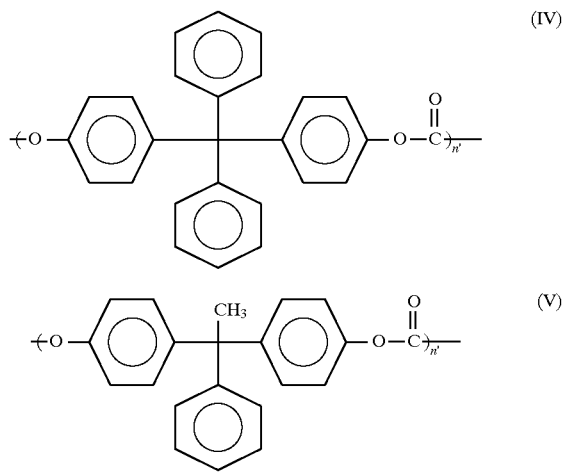

-continued

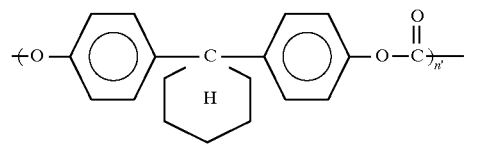 (VI)

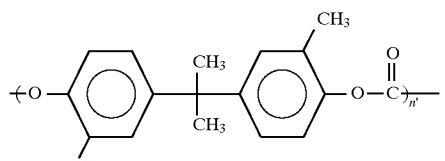 (VII)

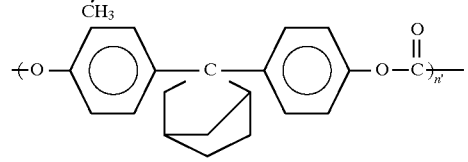 (VIII)

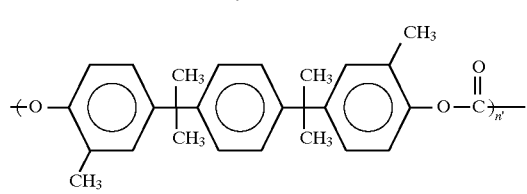 (IX)

wherein n' means a degree of polymerization that gives the above-mentioned molecular weight.

A charge transporting polymer to binder resin weight ratio preferably ranges from 10:0 to 8:10. When other charge transporting materials are used in combination, a weight ratio of the sum of the charge transporting polymer and the binder resin to the other charge transporting materials is preferably 10:0 to 10:8.

The charge generating layer is made up of any known charge generating material, preferably the aforementioned phthalocyanine crystals.

Binder resins which can be used in the charge generating layer can be chosen from a broad range of insulating resins. Examples of preferred insulating resins are polyvinyl butyral resins, polyarylate resins (e.g., a polycondensate of bisphenol A and phthalic acid), polycarbonate resins, polyester resins, phenoxy resins, vinyl chloride-vinyl acetate copolymers, polyamide resins, acrylic resins, polyacrylamide resins, polyvinylpyridine resins, cellulose resins, urethane resins, epoxy resins, casein polyvinyl alcohol, and polyvinylpyrrolidone. Organic photoconductive polymers such as poly-N-vinylcarbazole, polyvinylanthracene, polyvinylpyrene, and polysilane, can also be used. These binder resins may be used either individually or as a combination of two or more thereof.

A suitable weight ratio of the charge generating material to the binder resin ranges from 10:1 to 1:10. The charge generating material is dispersed in a solution of the binder resin in a usual manner by means of a ball mill, an attritor, a sand mill, etc. It is effective to reduce the disperse particle size to 0.5 μm or smaller, preferably 0.3 μm or smaller, still preferably 0.15 μm or smaller. General organic solvents can be used for dissolving the binder resin, including methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents may be used either individually or as a mixture of two or more thereof.

The present invention will now be illustrated in greater detail with reference to Synthesis Examples and Examples, but it should be understood that the present invention is not deemed to be limited thereto. Unless otherwise indicated, all the parts are given by weight.

SYNTHESIS EXAMPLE 1

Figure 2:
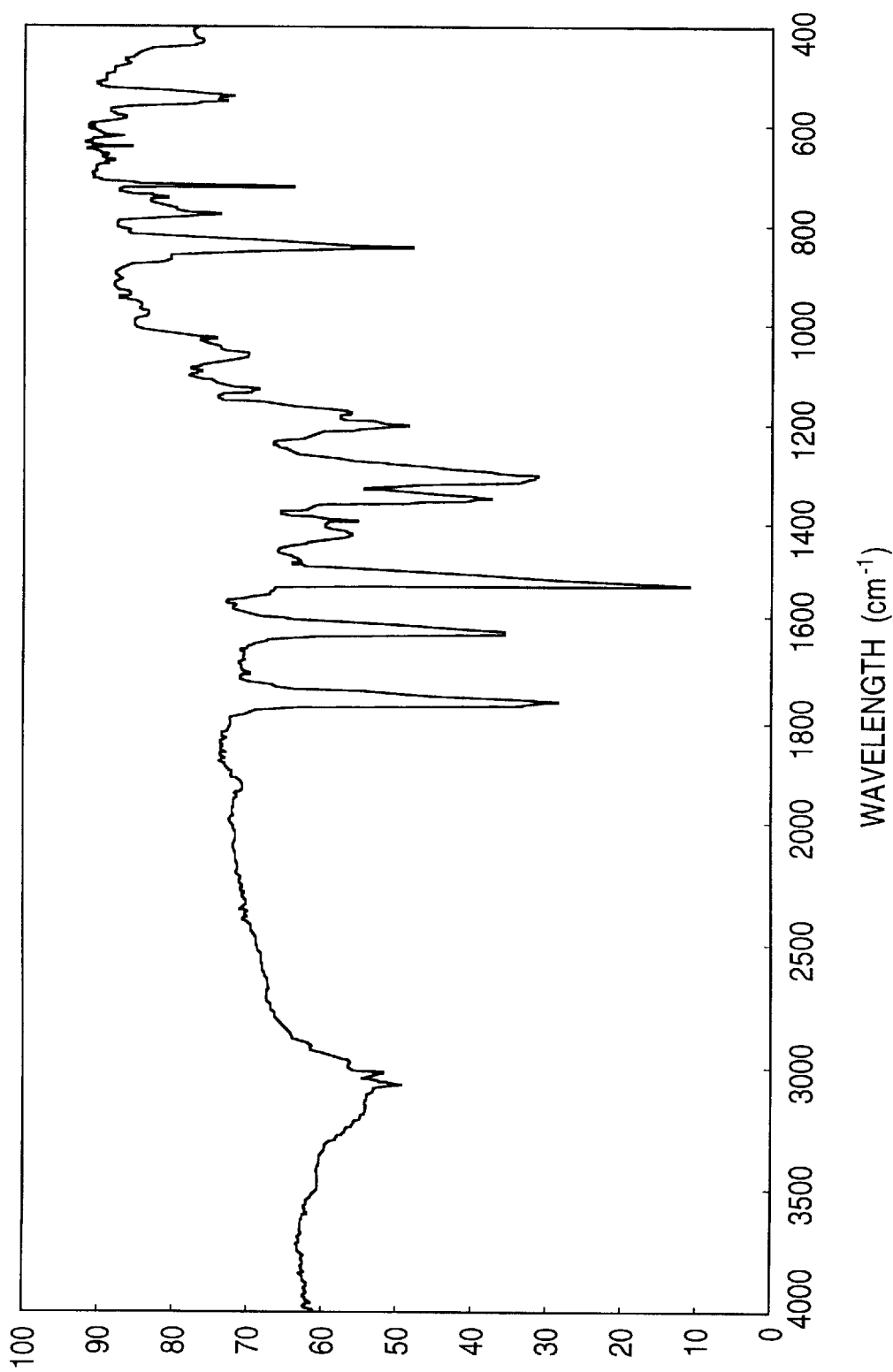
FIG. 2 is an infrared absorption spectrum of N,N'-diphenyl-N,N'-bis[4-(4-ethoxycarbonylethylphenyl)phenyl]-[1,1'-biphenyl]-4,4'-diamine.

Synthesis of N,N'-Diphenyl-N,N'-bis[4-(4-ethoxycarbonylethylphenyl)phenyl]-[1,1'-biphenyl]-4,4'-diamine:

In a 100 ml flask were charged 5.0 g of N,N'-diphenylbenzidine, 12.0 g of 4-ethoxycarbonylethyl-4'-iodobiphenyl, 5.3 g of potassium carbonate, 1.0 g of copper sulfate pentahydrate, and 20 ml of n-tridecane, and the mixture was allowed to react by heating at 230° C. for 1 hour in a nitrogen stream. After completion of the reaction, the reaction mixture was cooled to room temperature and dissolved in 50 ml of toluene. The insoluble matter was removed by filtration, and the filtrate was purified by silica gel column chromatography using toluene to give 8.2 g of the title compound as an oily substance. The infrared absorption spectrum (IR spectrum) of the compound is shown in FIG. 2.

SYNTHESIS EXAMPLE 2

Figure 3:
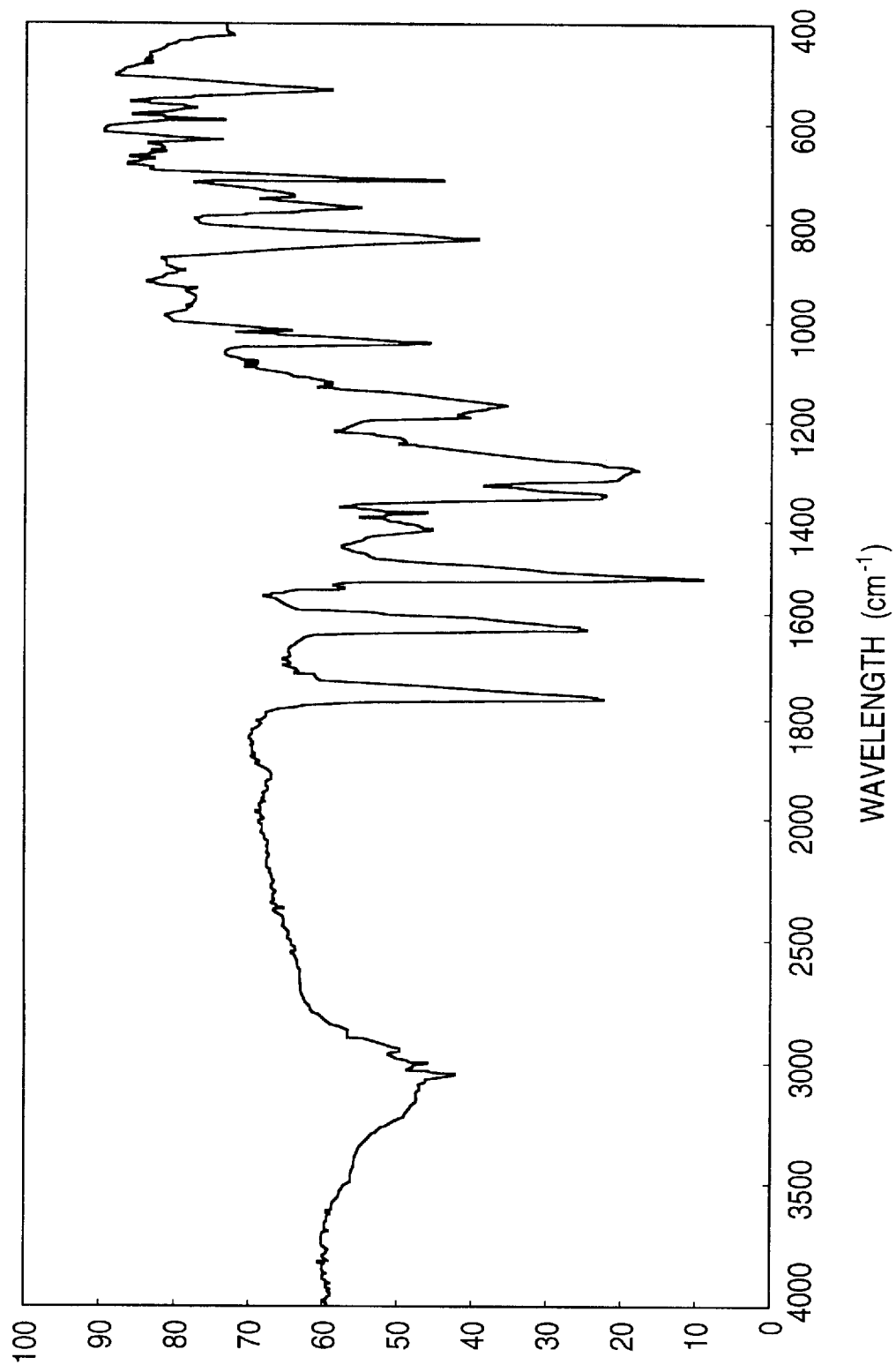
FIG. 3 is an infrared absorption spectrum of N,N'-diphenyl-N,N'-bis[4-(4-ethoxycarbonylethylphenyl)phenyl]-[1,1'-biphenyl]-4,4'-diamine.

Synthesis of N,N'-Diphenyl-N,N'-bis[4-(4-ethoxycarbonylethylphenyl)phenyl]-[1,1'-biphenyl]-4,4'-diamine:

In a 100 ml flask were charged 3.0 g of N,N'-diphenylbenzidine, 7.0 g of 4-ethoxycarbonylmethyl-4'-iodobiphenyl, 3.2 g of potassium carbonate, 0.5 g of copper sulfate pentahydrate, and 10 ml of n-tridecane, and the mixture was allowed to react by heating at 230° C. for 1 hour in a nitrogen stream. After completion of the reaction, the reaction mixture was cooled to room temperature and dissolved in 20 ml of toluene. The insoluble matter was removed by filtration, and the filtrate was purified by silica gel column chromatography using toluene to give 5.6 g of the title compound as an oily substance. The IR spectrum of the compound is shown in FIG. 3.

SYNTHESIS EXAMPLE 3

Figure 4:
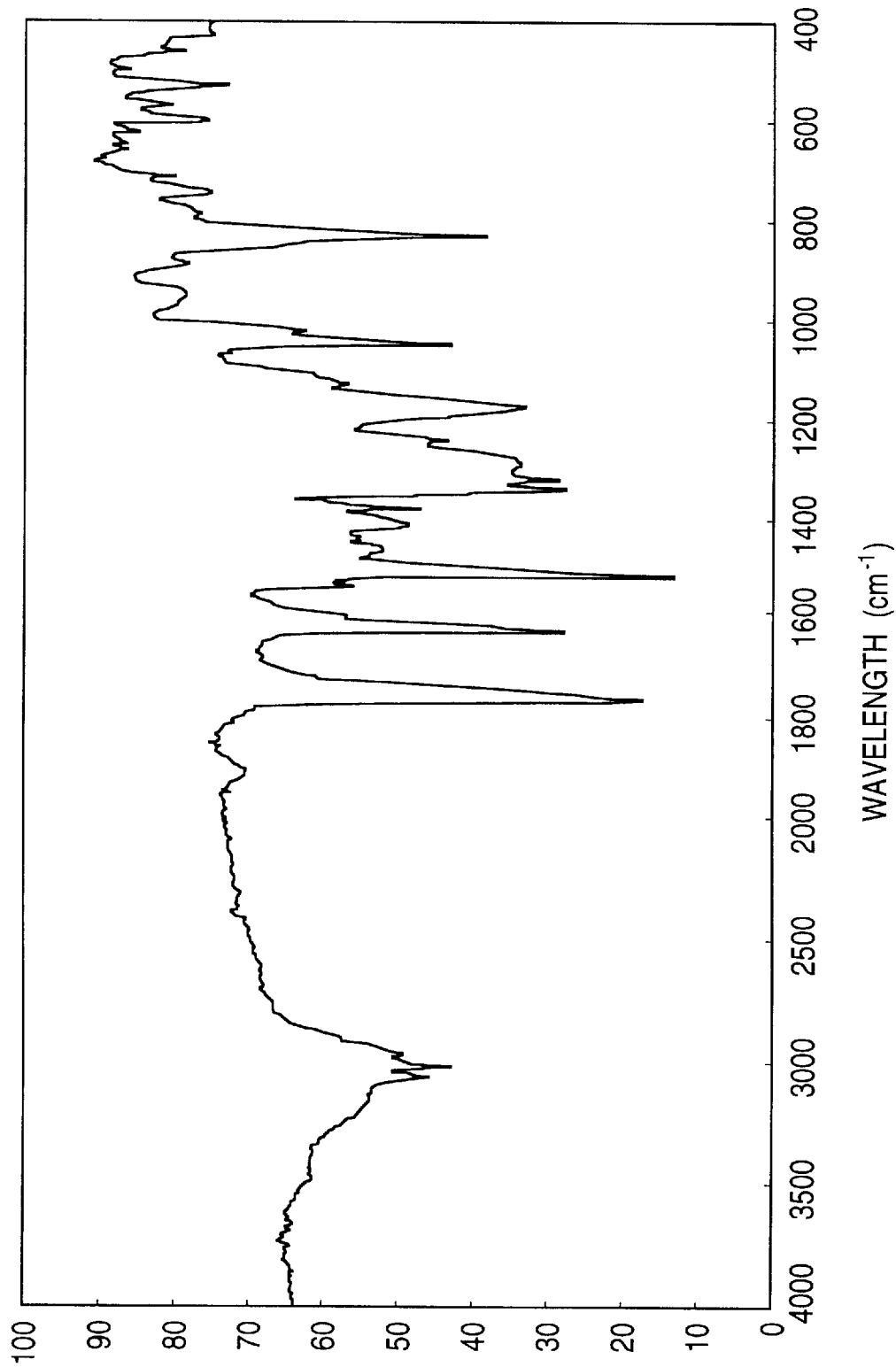
FIG. 4 is an infrared absorption spectrum of N,N-bis[4-(4-ethoxycarbonylmethylphenyl)phenyl]-3,4-xylidine.

Synthesis of N,N-Bis[4-(4-ethoxycarbonylmethylphenyl)phenyl]-3,4-xylidine:

In a 100 ml flask were charged 2.0 g of 3,4-xylidine, 13.0 g of 4-ethoxycarbonylmethyl-4'-iodobiphenyl, 6.0 g of potassium carbonate, 1.0 g of copper sulfate pentahydrate, and 10 ml of n-tridecane, and the mixture was allowed to react by heating at 230° C. for 8 hours in a nitrogen stream. After completion of the reaction, the reaction mixture was cooled to room temperature and dissolved in 30 ml of toluene. The insoluble matter was removed by filtration, and the filtrate was purified by silica gel column chromatography using toluene to give 5.3 g of the title compound as an oily substance. The IR spectrum of the compound is shown in FIG. 4.

SYNTHESIS EXAMPLE 4

To 230 parts of quinoline were added 30 parts of 1,3-diiminoisoindoline and 9.1 parts of gallium trichloride, and the mixture was allowed to react at 200° C. for 3 hours. The reaction product was collected by filtration, washed with acetone and methanol, and dried to obtain 28 parts of chlorogallium phthalocyanine crystals. Three parts of the resulting crystals were dry ground for 3 hours in a automatic mortar Labo-Mill UT-21, manufactured by Yamato Kagaku K.K. A 0.5 part portion of the grinds was milled in 20 parts of benzyl alcohol together with 60 parts of glass beads (diameter: 1 mm) at room temperature for 24 hours. The glass beads were separated by filtration, and the filtrate was washed with 10 parts of methanol and dried to obtain chlorogallium phthalocyanine crystals having intense diffraction peaks at Bragg's angles (2θ±0.2°) of 7.4°, 16.6°, 25.5°, and 28.3°. The resulting chlorogallium phthalocyanine crystals are designated CG-1.

SYNTHESIS EXAMPLE 5

To 350 ml of 1-chloronaphthalene were added 50 g of phthalonitrile and 27 g of anhydrous stannic chloride, and the mixture was allowed to react at 195° C. for 5 hours. The reaction product was collected-by filtration, washed successively with 1-chloronaphthalene, acetone, methanol, and water, and dried under reduced pressure to afford 18.3 g of dichlorotin phthalocyanine crystals. A 5 g portion of the resulting crystals was put in an agate-made pot together with 10 g of sodium chloride and 500 g of agate balls (diameter: 20 mm) and ground by means of a planetary ball mill Model P-5 manufactured by Fritsch Co., Ltd. at 400 rpm for 10 hours, thoroughly washed with water, and dried. A 0.5 g aliquot of the grinds was subjected to milling together with 15 g of tetrahydrofuran and 30 g of glass beads (diameter: 1 mm) at room temperature for 24 hours. The glass beads were separated by filtration, and the filtrate was washed with methanol and dried to obtain dichlorotin phthalocyanine crystals having intense diffraction peaks at Bragg's angles (2θ±0.2°) of 8.5°, 11.2°, 14.5°, and 27.2°. The resulting crystals are designated CG-2.

SYNTHESIS EXAMPLE 6

Three parts of the chlorogallium phthalocyanine crystals (CG-1) obtained in Synthesis Example 4 were dissolved in 60 parts of concentrated sulfuric acid at 0° C., and the acidic solution was dropped into 450 parts of distilled water kept at 5° C. to reprecipitate the crystals. The reprecipitated crystals were washed with distilled water, diluted aqueous ammonia, etc. and dried to recover 2.5 parts of hydroxygallium phthalocyanine crystals. The crystals were ground in an automatic mortar for 5.5 hours, and a 0.5 part aliquot of the grinds was subjected to milling together with 15 parts of dimethylformamide and 30 parts of glass beads (diameter: 1 mm) for 24 hours. The crystals were separated, washed with methanol, and dried to obtain hydroxygallium phthalocyanine crystals having intense diffraction peaks at Bragg's angles (2θ±0.2°) of 7.5°, 9.9°, 12.5°, 16.3°, 18.6°, 25.1°, and 28.3°. The resulting crystals are designated as CG-3.

SYNTHESIS EXAMPLE 7

To 200 parts of 1-chloronaphthalene were added 30 parts of 1,3-diiminoisoindoline and 17 parts of titanium tetrabutoxide, and the mixture was allowed to react at 190° C. for 5 hours in a nitrogen stream. The reaction product was collected by filtration, washed successively with aqueous ammonia, water, and acetone to yield 40 parts of titanyl phthalocyanine. Five parts of the resulting crystals were ground for 3 hours in an automatic mortar Labo-Mill UT-21 together with 10 parts of sodium chloride, thoroughly washed with distilled water, and dried to give 4.8 parts of titanyl phthalocyanine crystals, which exhibited a distinct diffraction peak at a Bragg's angle (2θ±0.2°) of 27.3°. Two parts of the crystals were stirred in a mixed solvent of 20 parts of distilled water and 2 parts of monochlorobenzene at 50° C. for 1 hour, filtered, thoroughly washed with methanol, and dried to furnish titanyl phthalocyanine hydrate crystals having an intense diffraction peak at a Bragg's angle (2θ±0.2°) of 27.3°. The resulting chlorogallium phthalocyanine crystals are designated as CG-4.

EXAMPLE 1

Synthesis of Charge Transporting Polymer (3)

Figure 5:
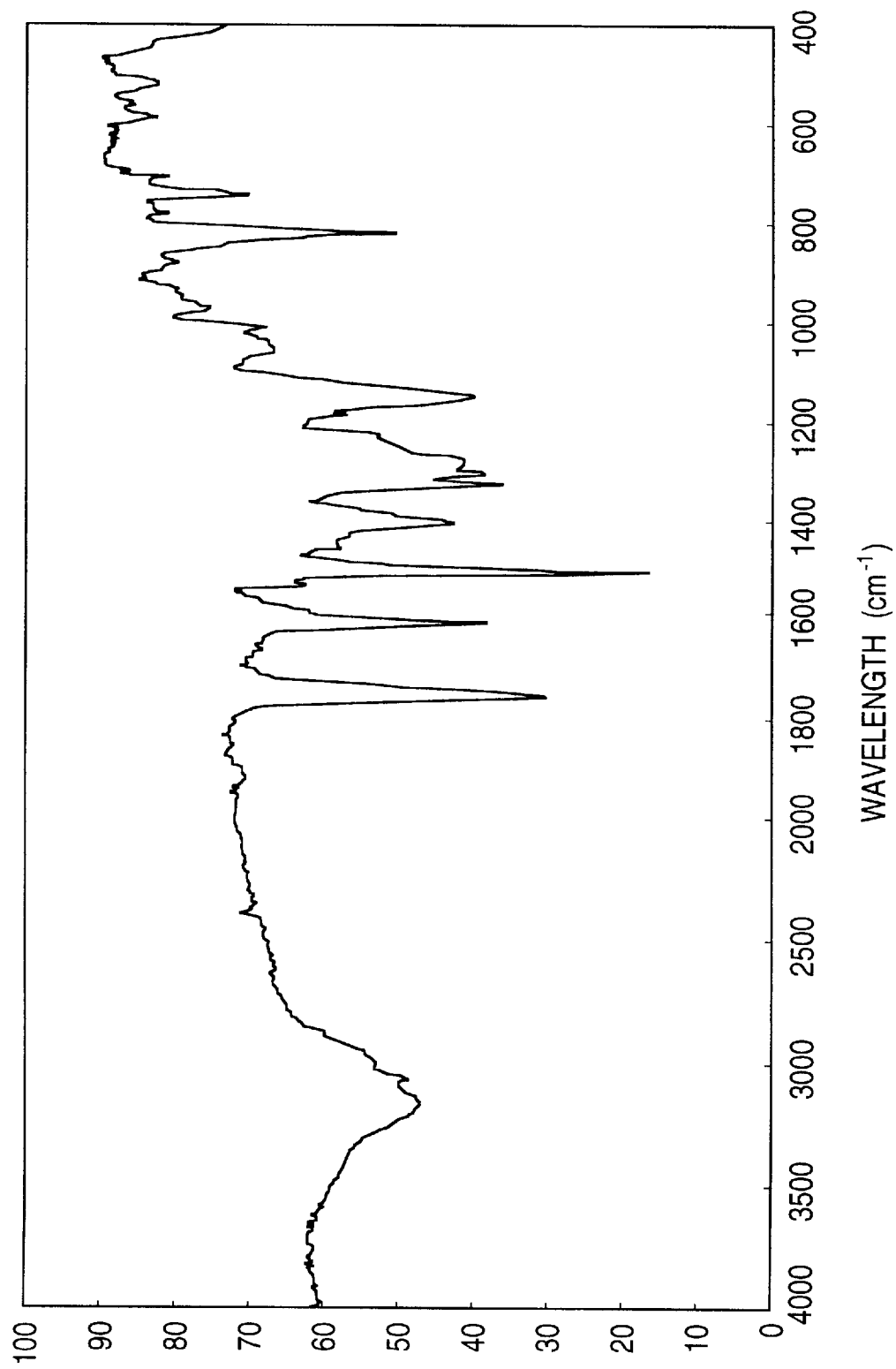
FIG. 5 is an infrared absorption spectrum of charge transporting polymer (3) prepared in Example 1.

In a 50 ml flask were put 1.0 g of N,N-bis[4-(4-ethoxycarbonylmethylphenyl)phenyl]-3,4-xylidine, 2.0 g of ethylene glycol, and 0.06 g of titanium tetrabutoxide, and the mixture was heated under reflux for 2 hours in a nitrogen atmosphere. After confirming the consumption of the N,N-bis[4-(4-ethoxycarbonylmethylphenyl)phenyl]-3,4-xylidine, the reaction pressure was reduced to 0.5 mmHg, and the reaction was continued at 230° C. for 5 hours while evaporating ethylene glycol. The reaction mixture was cooled to room temperature and dissolved in 50 ml of methylene chloride. The insoluble matter was separated by filtration, and the filtrate was added dropwise to 300 ml of ethanol under stirring to precipitate the polymer produced. The polymer was collected by filtration, thoroughly washed with ethanol, and dried to give 0.80 g of the polymer. The weight average molecular weight (Mw) of the resulting polymer was $1.20 \times 10^5$ as measured by gel-permeation chromatography (GPC) (styrene conversion; p=ca. 210). The IR spectrum of the polymer is shown in FIG. 5.

EXAMPLE 2

Synthesis of Charge Transporting Polymer (4)

Figure 6:
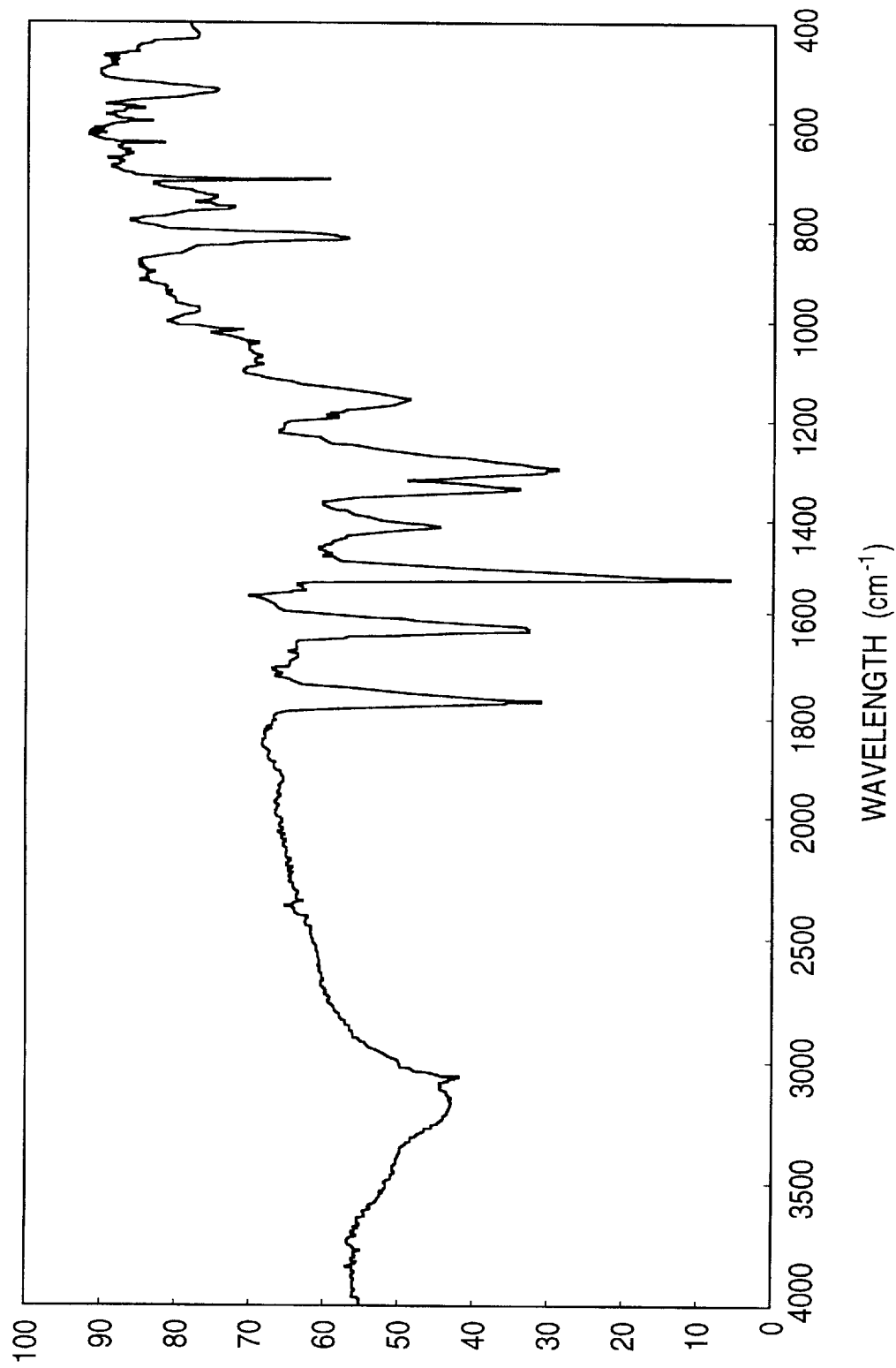
FIG. 6 is an infrared absorption spectrum of the charge transporting polymer (4) prepared in Example 2.

In a 50 ml flask were put 1.0 g of N,N'-diphenyl-N,N'-bis[4-(4-ethoxycarbonylmethylphenyl)phenyl]-[1,1'-biphenyl]-4,4'-diamine, 2.0 g of ethylene glycol, and 0.06 g of titanium tetrabutoxide, and the mixture was heated under reflux for 3 hours in a nitrogen atmosphere. After confirming the consumption of the N,N'-diphenyl-N,N'-bis[4-(4-ethoxycarbonylmethylphenyl)phenyl]-[1,1'-biphenyl]-4,4'-diamine, the reaction pressure was reduced to 0.5 mmHg, and the reaction was continued at 230° C. for 3 hours while evaporating ethylene glycol. The reaction mixture was cooled to room temperature and dissolved in 50 ml of methylene chloride. The insoluble matter was separated by filtration, and the filtrate was added dropwise to 100 ml of ethanol under stirring to precipitate the polymer produced. The polymer was collected by filtration, thoroughly washed with ethanol, and dried to give 0.80 g of the polymer. The Mw of the resulting polymer was $1.10 \times 10^5$ as measured by GPC (styrene conversion; p=ca. 140). The IR spectrum of the polymer is shown in FIG. 6.

EXAMPLE 3

Synthesis of Charge Transporting Polymer (5)

Figure 7:
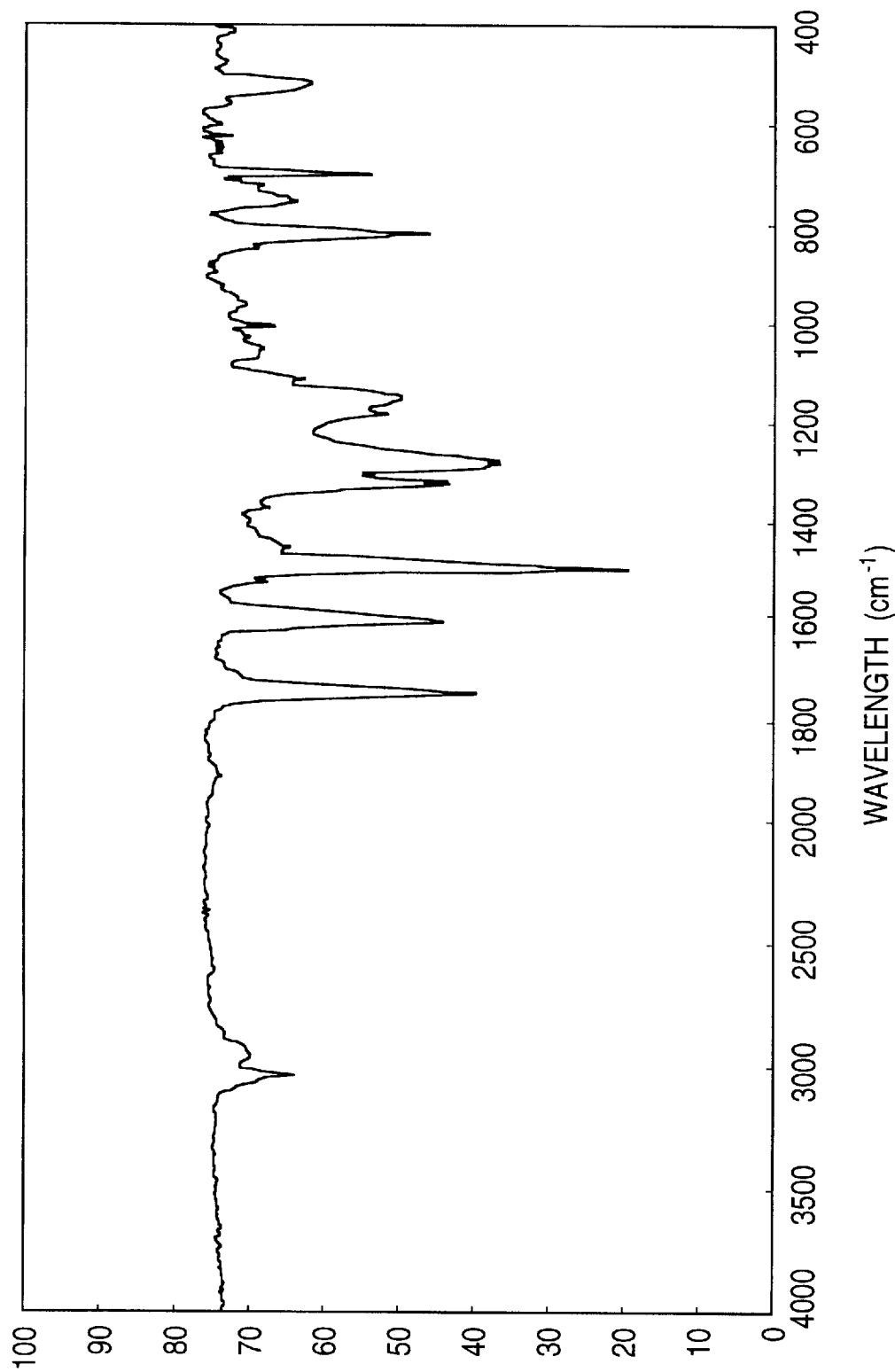
FIG. 7 is an infrared absorption spectrum of charge transporting polymer (5) prepared in Example 3.

In a 50 ml flask were put 1.0 g of N,N'-diphenyl-N,N'-bis[4-(4-ethoxycarbonylethylphenyl)phenyl]-[1,1'-biphenyl]-4,4'-diamine, 2.0 g of ethylene glycol, and 0.06 g of titanium tetrabutoxide, and the mixture was heated under reflux for 3 hours in a nitrogen atmosphere. After confirming the consumption of the N,N'-diphenyl-N,N'-bis[4-(4-ethoxycarbonylethylphenyl)phenyl]-[1,1'-biphenyl]-4,4'-diamine, the reaction pressure was reduced to 0.5 mmHg, and the reaction was continued at 230° C. for 3 hours while evaporating ethylene glycol. The reaction mixture was cooled to room temperature and dissolved in 50 ml of methylene chloride. The insoluble matter was separated by filtration, and the filtrate was added dropwise to 100 ml of ethanol under stirring to precipitate the polymer produced. The polymer was collected by filtration, thoroughly washed with ethanol, and dried to yield 0.85 g of the polymer. The Mw of the resulting polymer was $1.25 \times 10^5$ as measured by GPC (styrene conversion; p=ca. 155). The IR spectrum of the polymer is shown in FIG. 7.

EXAMPLE 4

Synthesis of Charge Transporting Polymer (13)

Figure 8:
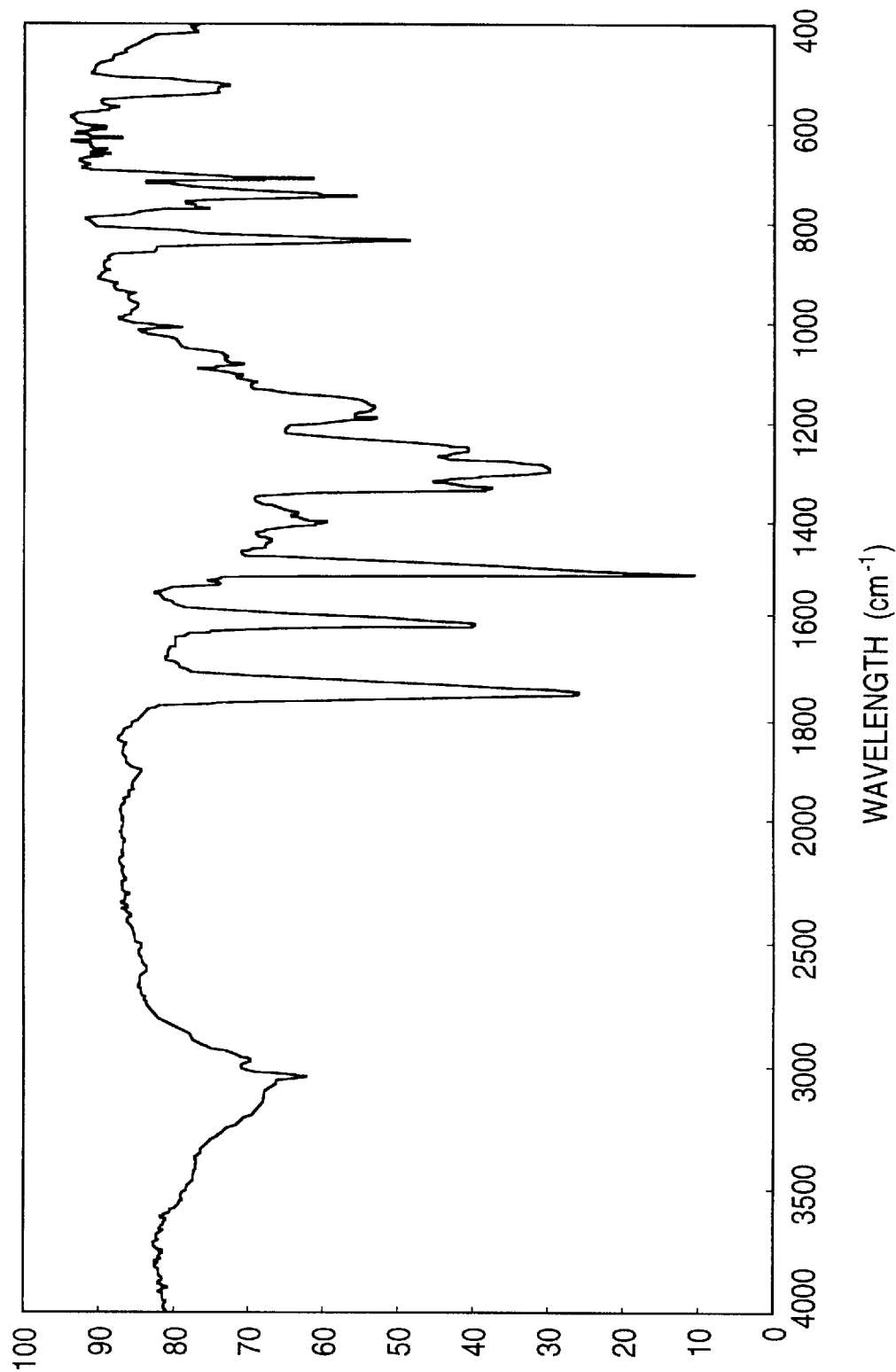
FIG. 8 is an infrared absorption spectrum of charge transporting polymer (13) prepared in Example 4.

In a 50 ml flask were put 1.0 g of N,N'-diphenyl-N,N'-bis[4-(4-ethoxycarbonylethylphenyl)phenyl]-[1,1'-biphenyl]-4,4'-diamine, 2.0 g of ethylene glycol, and 0.05 g of titanium tetrabutoxide, and the mixture was heated under reflux for 3 hours in a nitrogen atmosphere. After confirming the consumption of the N,N'-diphenyl-N,N'-bis[4-(4-ethoxycarbonylethylphenyl)phenyl]-[1,1'-biphenyl]-4,4'-diamine, the reaction pressure was reduced to 0.5 mmHg to remove ethylene glycol by evaporation. The reaction mixture was cooled to room temperature and dissolved in 20 ml of methylene chloride. To the reaction solution was added dropwise a solution of 0.24 g of isophthalic acid dichloride in 10 ml of methylene chloride, and 0.48 g of triethylamine was further added thereto, followed by heating under reflux for 30 minutes. To the reaction mixture was added 0.3 ml of methanol, followed by heat-refluxing for an addition 30 minute period. The insoluble matter was separated by filtration, and the filtrate was added dropwise to 300 ml of ethanol under stirring to precipitate the polymer produced. The polymer was collected by filtration and again dissolved in 50 ml of THF, and the solution was dropped into 300 ml of water under stirring to reprecipitate the polymer. The polymer was collected by filtration, thoroughly washed with ethanol, and dried to give 0.90 g of the polymer. The Mw of the resulting polymer was $1.60 \times 10^4$ as measured by GPC (styrene conversion; p=ca. 20). The IR spectrum of the polymer is shown in FIG. 8.

EXAMPLE 5

A coating composition comprising 10 parts of a zirconium compound Orgatics ZC540 produced by Matsumoto Seiyaku K.K., 1 part of a silane compound A1110 produced by Nippon Unicar Co., Ltd., 40 part of 2-propanol, and 20 parts of butanol was applied to an aluminum substrate by dip coating and dried at 150° C. for 10 minutes to form a 0.5 μm thick undercoat layer.

One part of CG-1 was mixed with 1 part of a polyvinyl butyral resin S-Lec BM-S produced by Sukisui Chemical Co., Ltd., and 100 parts of n-butyl acetate. The mixture was dispersed together with glass beads in a paint shaker for 1 hour. The resulting coating composition was applied onto the undercoat layer by dip coating and dried at 100° C. for 10 minutes to form a charge generating layer.

In 1.5 parts of monochlorobenzene was dissolved 0.2 part of charge transporting polymer (3). The resulting coating composition was applied to the charge generating layer by wire bar coating and dried at 120° C. for 1 hour to form a 15 μm thick charge transporting layer.

The resulting electrophotographic photoreceptor was evaluated as followed by use of an electrostatic paper analyzer EPA-8100 manufactured by Kawaguchi Denki K.K.

The photoreceptor was charged by a corona discharge to −6 kV under an ambient temperature and ambient humidity condition (20° C., 40% RH) and exposed to monochromatic light of 800 nm isolated from the light of a tungsten lamp by a monochromator so as to give energy of 1 μW/cm$^2$ on the surface of the photoreceptor. The initial surface potential $V_0$ (V) and the half-decay exposure $E_{1/2}$ (erg/cm$^2$) (energy required for reducing the surface potential by half) were measured. Thereafter, the photoreceptor was irradiated with white light of 10 lux for 1 second, and the residual potential $V_{RP}$ (V) was measured. The same measurement was made after repeating the above-described charging and exposure 1000 times, and the changes $\Delta V_0$, $\Delta E_{1/2}$ and $\Delta V_{RP}$ were obtained as indications of performance stability and durability. The results obtained are shown in Table 9 below.

EXAMPLES 6 TO 15

Electrophotographic photoreceptors were prepared and evaluated in the same manner as in Example 5, except for using the charge generating materials and charge transporting materials shown in Table 9. The results of evaluation are shown in the Table.

EXAMPLE 16

An electrophotographic photoreceptor was prepared and evaluated in the same manner as in Example 5, except for replacing 0.2 part of charge transporting polymer (3) used in Example 5 with 0.12 part of charge transporting polymer (4) and 0.08 part of a polycarbonate resin represented by formula (VI) (viscosity-average molecular weight: 39,000). The results of evaluation are shown in Table 9.

COMPARATIVE EXAMPLE 1

An electrophotographic photoreceptor was prepared and evaluated in the same manner as in Example 5, except for replacing 0.2 part of charge transporting polymer (3) used in Example 5 with 0.2 part of polyvinylcarbazole (PVK). The results of evaluation are shown in Table 9.

TABLE 9

| Example No. | Charge Transporting Material | Charge Generating Material | Electrophotographic Characteristics | | | | | | Stability | Durability | |
|---|---|---|---|---|---|---|---|---|---|---|---|
| | | | Initial | | | After Running Test | | | | | |
| | | | $V_0$ (V) | $E_{1/2}$ (erg/cm$^2$) | $V_{RP}$ (V) | $V_0$ (V) | $E_{1/2}$ (erg/cm$^2$) | $V_{RP}$ (V) | $\Delta E_{1/2}$ (erg/cm$^2$) | $\Delta V_0$ (V) | $\Delta V_{RP}$ (V) |
| Example 5 | (3) | CG-1 | −824 | 2.6 | −30 | −805 | 3.1 | −45 | 0.5 | 19 | 15 |
| Example 6 | (4) | CG-1 | −809 | 2.5 | −24 | −790 | 3.1 | −41 | 0.6 | 19 | 17 |
| Example 7 | (5) | CG-4 | −810 | 1.2 | −16 | −798 | 1.4 | −28 | 0.2 | 12 | 12 |
| Example 8 | (13) | CG-1 | −819 | 2.6 | −28 | −804 | 3.1 | −41 | 0.5 | 15 | 13 |
| Example 9 | (22) | CG-3 | −820 | 2.2 | −37 | −805 | 2.5 | −48 | 0.3 | 15 | 11 |
| Example 10 | (28) | CG-1 | −822 | 2.5 | −30 | −810 | 3.1 | −44 | 0.6 | 12 | 14 |
| Example 11 | (32) | CG-2 | −823 | 3.0 | −23 | −810 | 3.5 | −37 | 0.5 | 13 | 14 |
| Example 12 | (41) | CG-3 | −819 | 2.2 | −39 | −801 | 2.5 | −55 | 0.3 | 18 | 16 |

TABLE 9-continued

| Example No. | Charge Transporting Material | Charge Generating Material | Electrophotographic Characteristics | | | | | | Stability | Durability | |
|---|---|---|---|---|---|---|---|---|---|---|---|
| | | | Initial | | | After Running Test | | | | | |
| | | | $V_0$ (V) | $E_{1/2}$ (erg/cm$^2$) | $V_{RP}$ (V) | $V_0$ (V) | $E_{1/2}$ (erg/cm$^2$) | $V_{RP}$ (V) | $\Delta E_{1/2}$ (erg/cm$^2$) | $\Delta V_0$ (V) | $\Delta V_{RP}$ (V) |
| Example 13 | (44) | CG-2 | −826 | 3.1 | −31 | −811 | 3.6 | −48 | 0.5 | 15 | 17 |
| Example 14 | (48) | CG-2 | −828 | 3.1 | −29 | −815 | 3.7 | −46 | 0.6 | 13 | 17 |
| Example 15 | (55) | CG-3 | −810 | 2.2 | −27 | −796 | 2.5 | −43 | 0.3 | 14 | 16 |
| Example 16 | (4) + (VI) | CG-1 | −811 | 2.6 | −33 | −790 | 3.1 | −49 | 0.5 | 21 | 16 |
| Compar. Example 1 | PVK | CG-1 | −834 | 3.4 | −46 | −801 | 4.2 | −76 | 0.8 | 33 | 30 |

The charge transporting polymers represented by formula (I-1) or (I-2) are novel substances which are excellent in solubility and film-forming properties, which are synthesized with ease, and whose ionizing potential is controllable. Therefore, they are useful as a charge transporting material in the production of organic electronic devices. The organic electronic devices, particularly electrophotographic photoreceptors, according to the invention exhibit high photosensitivity and excellent stability to repeated use.

While the invention has been described in detail and with reference to specific embodiments thereof, it will be apparent to one skilled in the art that various changes and modifications can be made therein without departing from the spirit and scope thereof.

What is claimed is:

1. A charge transporting polymer represented by formula (I-1) or (I-2):

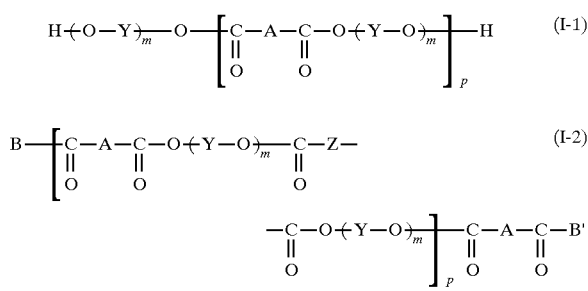

wherein Y represents a divalent hydrocarbon group; Z represents a divalent hydrocarbon group; A represents a group represented by formula:

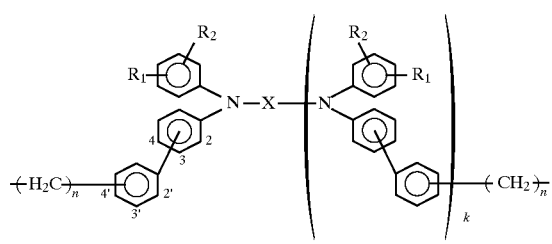

wherein $R_1$ and $R_2$ each represents a hydrogen atom, an alkyl group, an alkoxy group, a substituted amino group or a halogen atom; X represents a substituted or unsubstituted divalent aromatic group; n represents an integer of 1 to 5; and k represents 0 or 1, B and B' each independently represents a group —O—(Y—O)$_m$—H or a group —O—(Y—O)$_m$—CO—Z—CO—OR', wherein R' represents a hydrogen atom, an alkyl group, a substituted or unsubstituted aryl group or a substituted or unsubstituted aralkyl group; Y represents a divalent hydrocarbon group; Z represents a divalent hydrocarbon group; and m represents an integer of 1 to 5; m represents an integer of 1 to 5; and p represents an integer of 5 to 5000.

2. A charge transporting polymer according to claim 1, wherein X in A is a substituted or unsubstituted biphenylene group.

3. An organic electronic device comprising an electrically conductive substrate having provided thereon a functional layer, wherein said functional layer contains a charge transporting polymer represented by formula (I-1) or (I-2):

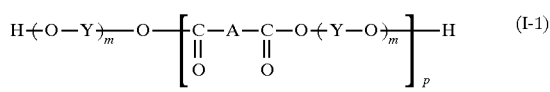

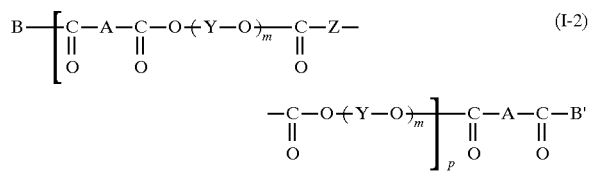

wherein Y represents a divalent hydrocarbon group; Z represents a divalent hydrocarbon group; A represents a group represented by formula:

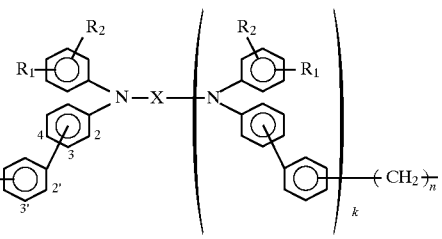

wherein $R_1$ and $R_2$ each represents a hydrogen atom, an alkyl group, an alkoxy group, a substituted amino group or a halogen atom; X represents a substituted or unsubstituted divalent aromatic group; n represents an integer of 1 to 5; and k represents 0 or 1, B and B' each independently represents a group —O—(Y—O)$_m$—H or a group —O—(Y—O)$_m$—CO—Z—CO—OR', wherein R' represents a hydrogen atom, an alkyl group, a substituted or unsubstituted aryl group or a substituted or unsubstituted aralkyl group; Y represents a divalent hydrocarbon group; Z represents a divalent hydrocarbon group; and m represents an integer of 1 to 5; m represents an integer of 1 to 5; and p represents an integer of 5 to 5000.

4. An electrophotographic photoreceptor comprising an electrically conductive substrate having provided thereon a photosensitive layer, wherein said photosensitive layer contains a charge transporting polymer represented by formula (I-1) or (I-2):

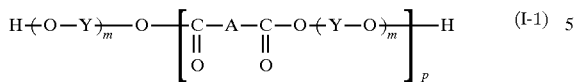

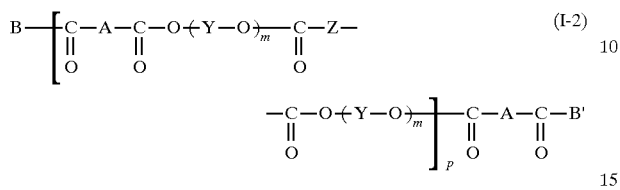

wherein Y represents a divalent hydrocarbon group; Z represents a divalent hydrocarbon group; A represents a group represented by formula:

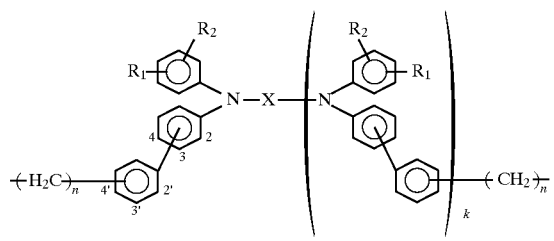

wherein $R_1$ and $R_2$ each represents a hydrogen atom, an alkyl group, an alkoxy group, a substituted amino group or a halogen atom; X represents a substituted or unsubstituted divalent aromatic group; n represents an integer of 1 to 5; and k represents 0 or 1, B and B' each independently represents a group —O—(Y—O)$_m$—H or a group —O—(Y—O)$_m$—CO—Z—CO—OR', wherein R' represents a hydrogen atom, an alkyl group, a substituted or unsubstituted aryl group or a substituted or unsubstituted aralkyl group; Y represents a divalent hydrocarbon group; Z represents a divalent hydrocarbon group; and m represents an integer of 1 to 5; m represents an integer of 1 to 5; and p represents an integer of 5 to 5000.

5. An electrophotographic photoreceptor according to claim 4, wherein said photosensitive layer contains crystals selected from halogenogallium phthalocyanine crystals, halogenotin phthalocyanine crystals, hydroxygallium phthalocyanine crystals, and titanyl phthalocyanine crystals.

6. An electrophotographic photoreceptor comprising an electrically conductive substrate having provided thereon a charge generating layer and a charge transporting layer, wherein said charge transporting layer contains a charge transporting polymer represented by formula (I-1) or (I-2):

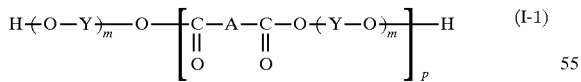

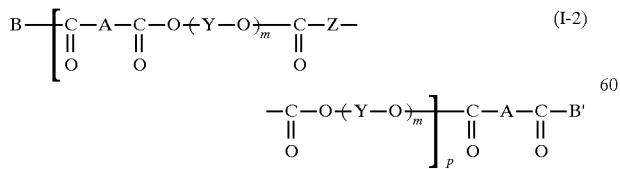

wherein Y represents a divalent hydrocarbon group; Z represents a divalent hydrocarbon group; A represents a group represented by formula:

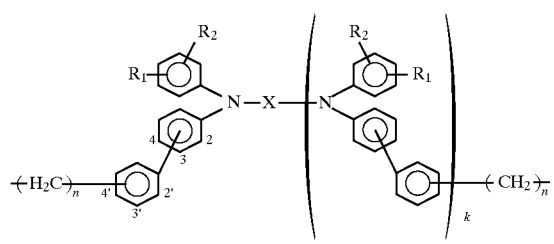

wherein $R_1$ and $R_2$ each represents a hydrogen atom, an alkyl group, an alkoxy group, a substituted amino group or a halogen atom; X represents a substituted or unsubstituted divalent aromatic group; n represents an integer of 1 to 5; and k represents 0 or 1, B and B' each independently represents a group —O—(Y—O)$_m$—H or a group —O—(Y—O)$_m$—CO—Z—CO—OR', wherein R' represents a hydrogen atom, an alkyl group, a substituted or unsubstituted aryl group or a substituted or unsubstituted aralkyl group; Y represents a divalent hydrocarbon group; Z represents a divalent hydrocarbon group; and m represents an integer of 1 to 5; m represents an integer of 1 to 5; and p represents an integer of 5 to 5000.

7. An electrophotographic photoreceptor according to claim 6, wherein said charge generating layer contains crystals selected from halogenogallium phthalocyanine crystals, halogenotin phthalocyanine crystals, hydroxygallium phthalocyanine crystals, and titanyl phthalocyanine crystals.

8. The charge transporting polymer of claim 1, wherein said polymer has a weight average molecular weight of 10,000 to 300,000.

9. The charge transporting polymer of claim 1, wherein X is represented by one of the following formulas:

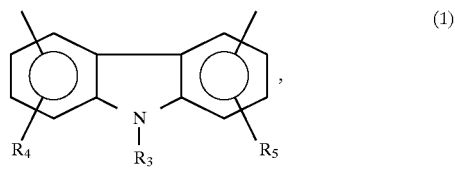

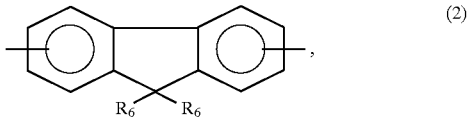

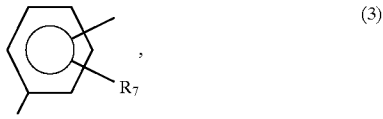

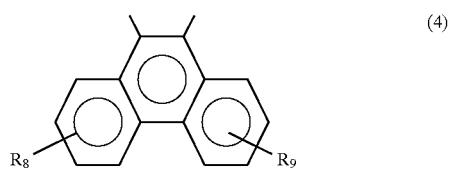

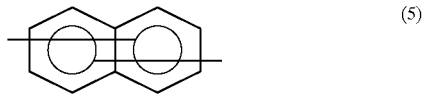

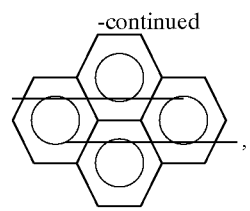 (6)

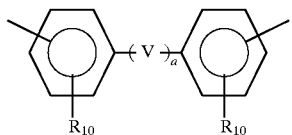 (7)

wherein $R_3$ represents H, an alkyl group having 1 to 4 carbon atoms, a substituted or unsubstituted phenyl group, or a substituted or unsubstituted aralkyl group;

$R_4$, $R_5$, $R_6$, $R_7$, $R_8$, $R_9$, and $R_{10}$ each represents H, an alkyl group having 1 to 4 carbon atoms, a substituted or unsubstituted phenyl group, a substituted or unsubstituted aralkyl group or a halogen atom;

a represents 0 or 1; and

V represents one of the following formulas:

 (8)

 (9)

 (10)

 (11)

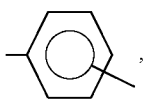 (12)

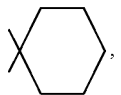 (13)

 (14)

 (15)

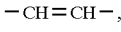 (16)

 (17)

wherein b is 1 to 10; and c is 1 to 3.

10. The charge transporting polymer of claim 2, wherein X is represented by one of the following formulas:

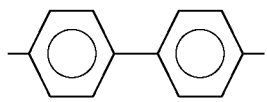 (A)

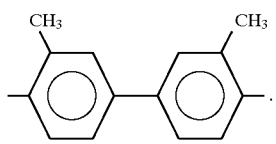 (B)

11. The charge transporting polymer of claim 1, wherein Y and Z are independently represented by one of the following formulas:

 (18)

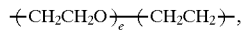 (19)

 (20)

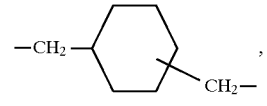 (21)

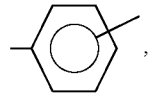 (22)

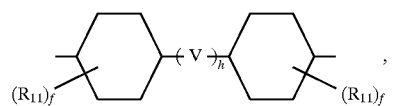 (23)

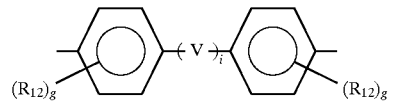 (24)

wherein $R_{11}$ and $R_{12}$ each represent H, an alkyl group having 1 to 4 carbon atoms, an alkoxy group having 1 to 4 carbon atoms, a substituted or unsubstituted phenyl group, a substituted or unsubstituted aralkyl group or a halogen atom;

wherein d and e each represent 1 to 10; f and g each represents 0, 1 or 2; h and i each is 0 or 1; and V is a group represented by one of the following formulas:

 (8)

 (9)

 (10)

 (11)

 (12)

 (13)

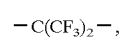 (14)

 (15)

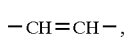 (16)

 (17)

wherein b is 1 to 10; and c is 1 to 3.

* * * * *